(12) United States Patent
Reeves et al.

(10) Patent No.: US 8,819,180 B2
(45) Date of Patent: Aug. 26, 2014

(54) INTEGRATED HANDSET BROWSER SETTINGS

(75) Inventors: Brian Reeves, Hamilton (CA); Paul Reeves, Oakville (CA); Richard Teltz, Hamilton (CA); David Reeves, Ancaster (CA); Sanjiv Sirpal, Oakville (CA); Chris Tyghe, Oakville (CA)

(73) Assignee: Z124, George Town (KY)

( * ) Notice: Subject to any disclaimer, the term of this patent is extended or adjusted under 35 U.S.C. 154(b) by 166 days.

(21) Appl. No.: 13/251,434

(22) Filed: Oct. 3, 2011

(65) Prior Publication Data
US 2012/0143944 A1   Jun. 7, 2012

Related U.S. Application Data

(60) Provisional application No. 61/389,117, filed on Oct. 1, 2010, provisional application No. 61/507,199, filed on Jul. 13, 2011, provisional application No. 61/507,201, filed on Jul. 13, 2011, provisional application No. 61/507,203, filed on Jul. 13, 2011, provisional application No. 61/507,206, filed on Jul. 13, 2011, provisional application No. 61/507,209, filed on Jul. 13, 2011.

(51) Int. Cl.
*G06F 15/16* (2006.01)
*G06F 13/00* (2006.01)

(52) U.S. Cl.
USPC .......................................... 709/218; 710/304

(58) Field of Classification Search
USPC ............................. 709/218; 710/304; 717/174
See application file for complete search history.

(56) References Cited

U.S. PATENT DOCUMENTS

| 5,742,825 | A  | * | 4/1998 | Mathur et al. | 719/329 |
|---|---|---|---|---|---|
| 6,460,136 | B1 | * | 10/2002 | Krohmer et al. | 713/2 |
| 6,990,573 | B2 | * | 1/2006 | Cherian et al. | 713/1 |
| 7,167,974 | B2 | * | 1/2007 | Roth et al. | 713/1 |

(Continued)

FOREIGN PATENT DOCUMENTS

WO        WO 01/22606        3/2001

OTHER PUBLICATIONS

Google Image Result for Fujitsu Dual Screen Phone, published date unknown, [retrieved Apr. 18, 2011], 1 page. Retrieved from: www.google.com/imgres?imgurl=http://www.computerriver.com/images/dual-screen-phone.jpg (Continued)

*Primary Examiner* — Brian P Whipple
*Assistant Examiner* — Michael A Chambers
(74) *Attorney, Agent, or Firm* — Sheridan Ross P.C.

(57) ABSTRACT

A mobile computing device with a mobile operating system and desktop operating system running concurrently and independently on a shared kernel without virtualization. The mobile operating system provides a user experience for the mobile computing device that suits the mobile environment. The desktop operating system provides a full desktop user experience when the mobile computing device is docked to a second user environment. A seamless cross-environment workflow is provided in a multi-operating system computing environment. Two or more application programs, running in independent operating systems, share user interaction state information including user data, user settings, and/or application context information. Interaction state information may be shared for applications that are used primarily to access and edit local user content as well as applications that communicate to a remote server or access and navigate other remote content (i.e., Internet-based application, browser).

20 Claims, 12 Drawing Sheets

(56) References Cited

U.S. PATENT DOCUMENTS

| | | | |
|---|---|---|---|
| 7,526,774 B1* | 4/2009 | Beck et al. | 719/320 |
| 7,870,321 B2* | 1/2011 | Rofougaran | 710/303 |
| 8,151,100 B2* | 4/2012 | Rofougaran et al. | 713/2 |
| 8,195,860 B2* | 6/2012 | Rofougaran | 710/300 |
| 2001/0020268 A1* | 9/2001 | Kawano et al. | 713/2 |
| 2007/0050765 A1* | 3/2007 | Geisinger | 718/1 |
| 2007/0050770 A1* | 3/2007 | Geisinger | 718/100 |
| 2007/0067769 A1* | 3/2007 | Geisinger | 718/1 |
| 2007/0074191 A1* | 3/2007 | Geisinger | 717/148 |
| 2007/0074192 A1* | 3/2007 | Geisinger | 717/148 |
| 2007/0136721 A1* | 6/2007 | Dunshea et al. | 717/174 |
| 2007/0250653 A1 | 10/2007 | Jones | |
| 2007/0271557 A1* | 11/2007 | Geisinger | 717/163 |
| 2007/0283324 A1* | 12/2007 | Geisinger | 717/120 |
| 2008/0028401 A1* | 1/2008 | Geisinger | 718/1 |
| 2008/0082815 A1* | 4/2008 | Kawano et al. | 713/2 |
| 2009/0055601 A1* | 2/2009 | McKenney et al. | 711/153 |
| 2009/0196280 A1* | 8/2009 | Rofougaran | 370/351 |
| 2009/0197641 A1* | 8/2009 | Rofougaran et al. | 455/556.1 |
| 2009/0197642 A1* | 8/2009 | Rofougaran et al. | 455/556.1 |
| 2009/0198798 A1* | 8/2009 | Rofougaran et al. | 709/220 |
| 2009/0198852 A1* | 8/2009 | Rofougaran | 710/300 |
| 2009/0198854 A1* | 8/2009 | Rofougaran et al. | 710/303 |
| 2009/0198989 A1* | 8/2009 | Rofougaran et al. | 713/2 |
| 2009/0199219 A1* | 8/2009 | Rofougaran et al. | 719/330 |
| 2010/0088635 A1* | 4/2010 | Louch | 715/802 |
| 2010/0217835 A1* | 8/2010 | Rofougaran | 709/218 |
| 2010/0217836 A1* | 8/2010 | Rofougaran | 709/218 |
| 2010/0217912 A1* | 8/2010 | Rofougaran | 710/304 |
| 2011/0093691 A1 | 4/2011 | Galicia et al. | |
| 2012/0084542 A1 | 4/2012 | Reeves et al. | |
| 2012/0084791 A1 | 4/2012 | Benedek et al. | |
| 2012/0084792 A1 | 4/2012 | Benedek et al. | |
| 2012/0086717 A1 | 4/2012 | Liu | |
| 2013/0021262 A1 | 1/2013 | Chen | |
| 2013/0080937 A1 | 3/2013 | Sirpal et al. | |

OTHER PUBLICATIONS

Google Image Result for LG Dual Touch Screen Concept Phone by Eugene Kim, published date unknown, [retrieved Apr. 18, 2011], 1 page. Retrieved from: www.google.com/imgres?imgurl=http://fgadgets.com/wp-content/uploads/2010/08/lg-dual-touch-screen-phone-Eugene-Kim-01.jpg.

Google Image Result for Fujitsu Dual Screen Phone, published date unknown, [retrieved Apr. 18, 2011], 1 page. Retrieved from: www.google.com/imgres?imgurl=http://www.gsmdome.com/wp-content/uploads/2010/10/fujitsu-dual-screen-phone_w2cP7_54.jpg.

Google Image Result for Kyocera Echo, published date unknown, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg Google Image Result for HTC Triple Viper, published date unknown, [retrieved Apr. 18, 2011], 1 page. Retrieved from:www.google.com/imgres?imgurl=http://www.santafemods.com/Forum/AndroidForums/htcTripleViper.png.

Google Image Result for Dual-Screen Phone, [retrieved Apr. 18, 2011], 1 page. Retrieved from: www.google.com/imgres?imgurl=http://www.netshet.org/wp-content/uploads/2011/02/Dual-Scree . . . .

Website entitled, "Kyocera Echo," Kyocera Communications, Inc., 2011, [retrieved on Aug. 27, 2012], 6 pages. Retrieved from: www.echobykyocera.com/.

Website entitled "Lapdock™ for Motorola ATRIX," Motorola Mobility, Inc, 2011, [retrieved on Apr. 18, 2011], 1 page. Retrieved from: www.motorola.com/Consumers/US-EN/Consumer-Product-and-Services/Mobile+Ph . . . .

Website entitled "Motorola ATRIX 4G Laptop Dock Review," phoneArena.com, posted Mar. 2, 2011, [retrieved on Apr. 18, 2011], 6 pages. Retrieved from: www.phonearena.com/reviews/Motorola-ATRIX-4G-Laptop-Dock-Review_id2667.

Website entitled, "Sony Tablet," Sony Corporation, 2012, [retrieved on Aug. 27, 2012], 3 pages. Retrieved from: www.store.sony.com/webapp/wcs/stores/servlet/CategoryDisplay?catalogId=10551&storeId=10151&langId=-1&categoryId=8198552921644795521.

Burns, C., "Motorola ATRIX 4G Laptop Dock Review," Android Community, Feb. 20, 2011, [retrieved on Apr. 18, 2011], 5 pages. Retrieved from: www.androidcommunity.com/motorola-atrix-4g-laptop-dock-review-20110220/.

Catacchio, "This smartphone has two huge screens . . . that rotate," The Next Web, Inc., Oct. 7, 2010, [retrieved on Jul. 21, 2011], 2 pages. Retrieved from: www.thenextweb.com/asia/2010/10/07/this-smartphone-has-two-huge-screens-that-rotate/.

Posted by Harman03, "Kyocera Echo Dual-screen Android Phone," posted 4 weeks from Apr. 18, 2011, [retrieved on Apr. 18, 2011], 3 pages. Retrieved from: www.unp.me/f106/kyocera-echo-dual-screen-android-phone-143800/.

Stein, S., "How does the Motorola Atrix 4G Lapdock compare with a laptop?"Crave—CNET, Feb. 9, 2011 [retrieved on Apr. 18, 2011], 7 pages. Retrieved from: www.news.cnet.com/8301-17938_105-20031251-1.html.

International Search Report and Written Opinion for International (PCT) Patent Application No. PCT/US2011/054601 mailed Apr. 19, 2012, 8 pages.

International Preliminary Report on Patentability for International (PCT) Patent Application No. PCT/US2011/054601 mailed Apr. 11, 2013, 7 pages.

\* cited by examiner

INTEGRATED HANDSET BROWSER SETTINGS

CROSS-REFERENCE TO RELATED APPLICATIONS

This Application is a non-provisional of and claims the benefit of the filing date of U.S. Provisional Application Nos. 61/389,117, filed Oct. 1, 2010, entitled "Multi-Operating System Portable Docking Device"; 61/507,199, filed Jul. 13, 2011, entitled "Dockable Mobile Software Architecture"; 61/507,201, filed Jul. 13, 2011, entitled "Cross-Environment Communication Framework"; 61/507,203, filed Jul. 13, 2011, entitled "Multi-Operating System"; 61/507,206, filed Jul. 13, 2011, entitled "Auto-Configuration of a Docked System in a Multi-OS Environment"; and 61/507,209, filed Jul. 13, 2011, entitled "Auto-Waking of a Suspended Secondary OS in a Dockable System," wherein the entire contents of the foregoing priority applications are incorporated herein by reference for all purposes.

BACKGROUND

1. Field

This Application relates generally to the field of mobile computing environments, and more particularly to supporting multiple user environments through the use of multiple operating systems in a single mobile computing device.

2. Relevant Background

Mobile computing devices are becoming ubiquitous in today's society. For example, as of the end of 2008, 90 percent of Americans had a mobile wireless device. At the same time, the capabilities of mobile devices are advancing rapidly, including smartphones that integrate advanced computing capabilities with mobile telephony capabilities. Mobile providers have launched hundreds of new smartphones in the last three years based upon several different platforms (e.g., Apple iPhone, Android, BlackBerry, Palm, and Windows Mobile). In the U.S., smartphone penetration reached almost 23% by the middle of 2010, and over 35% in some age-groups. In Europe, the smartphone market grew by 41% from 2009 to 2010, with over 60 million smartphone subscribers as of July 2010 in the five largest European countries alone.

While smartphones are gaining in popularity and computing capability, they provide a limited user experience. Specifically, they typically have an operating system that is modified for mobile device hardware and a restricted set of applications that are available for the modified operating system. For example, many smartphones run Google's Android operating system. Android runs only applications that are specifically developed to run within a Java-based virtual machine runtime environment. In addition, while Android is based on a modified Linux kernel, it uses different standard C libraries, system managers, and services than Linux. Accordingly, applications written for Linux do not run on Android without modification or porting. Similarly, Apple's iPhone uses the iOS mobile operating system. Again, while iOS is derived from Mac OS X, applications developed for OS X do not run on iOS. Therefore, while many applications are available for mobile operating systems such as Android and iOS, many other common applications for desktop operating systems such as Linux and Mac OS X are not available on the mobile platforms.

Accordingly, smartphones are typically suited for a limited set of user experiences and provide applications designed primarily for the mobile environment. In particular, smartphones do not provide a suitable desktop user experience, nor do they run most common desktop applications. As a result, many users carry and use multiple computing devices including a smartphone, laptop, and/or tablet computer. In this instance, each device has its own CPU, memory, file storage, and operating system.

Connectivity and file sharing between smartphones and other computing devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

SUMMARY

Embodiments of the present invention are directed to providing the mobile computing experience of a smartphone and the appropriate user experience of a secondary terminal environment in a single mobile computing device. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by a wired (e.g., USB, Firewire, Thunderbolt, etc.) or wireless (e.g., Bluetooth, WiFi, etc.) connection. In embodiments, a mobile operating system associated with the user experience of the mobile environment and a desktop operating system associated with the user experience of the secondary terminal environment are run concurrently and independently on a shared kernel.

According to aspects consistent with various embodiments, a cross-environment workflow is provided by a method that includes maintaining user settings and application context information in a first computing environment in relation to a first client-server application running on a first operating system of the first computing environment, the first computing environment configured to run the first operating system and a second operating system concurrently on a shared kernel, displaying a first user interaction environment of the first client-server application via the first computing environment according to the user settings and the application context information, the first user interaction environment reflecting a current interaction state, detecting a docking event indicating that the mobile computing environment is docked with a desktop computing environment, and applying, by a second client-server application running in the second operating system, the application context information to present a second user interaction environment via the second client-server application on a display of a second computing environment associated with the second operating system that substantially reflects the current interaction state.

According to other aspects consistent with various embodiments, the second user interaction environment looks substantially like the first user interaction environment. The first operating system may be a mobile operating system implemented on a mobile processor, and the second operating system may be a desktop operating system implemented on the mobile processor. The first computing environment may be a mobile computing environment implemented in a mobile device on a mobile processor comprising the shared kernel, and the second computing environment may be a desktop computing environment. The application context information may be stored in a database accessed by the first and second applications through an application programming interface.

The first client-server application and the second client-server application may be web browsers and the application context information may include cookies.

According to other aspects consistent with various embodiments, the method may include launching the second client-server application in response to detecting the docking event. The method may include detecting whether the current interaction state is directly compatible with display via the second client-server application. According to these aspects, presenting the second user interaction environment via the second client-server application on the display of the second computing environment that substantially reflects the current interaction state may include displaying the first user interaction environment of the first client-server application via the display of the second computing environment when the current interaction state is not directly compatible with display via the second client-server application. Alternatively, presenting the second user interaction environment via the second client-server application on the display of the second computing environment that substantially reflects the current interaction state may include translating the current interaction state into a compatible interaction state tailored for the second client-server application and presenting the compatible interaction state via the second user interaction environment when the current interaction state is not directly compatible with display via the second client-server application.

According to other aspects consistent with various embodiments, the application context information may include a network address of information displayed to a user by the first client-server application via the first computing environment immediately prior to detecting the docking event. According to these aspects, the first client-server application may be a mobile web browser and the second client-server application may be a desktop web browser and the network address may be a uniform resource listing (URL) address.

According to other aspects consistent with various embodiments, the first client-server application may be a mobile web browser and the second client-server application may be a desktop web browser. According to these aspects, the application context information may include a plurality of network addresses, each indicating a webpage open on the mobile web browser immediately prior to detecting the docking event. Further according to these aspects, presenting the second user interaction environment via the second client-server application on the display of the second computing environment that substantially reflects the current interaction state may include assigning each of the plurality of network addresses to a separate tab of the desktop web browser.

BRIEF DESCRIPTION OF THE DRAWINGS

Embodiments of the present invention are illustrated in referenced figures of the drawings, in which like numbers refer to like elements throughout the description of the figures.

DETAILED DESCRIPTION

Mobile telephony devices, (i.e., smartphones, handsets, mobile stations, portable communication devices, etc.) that include computing capabilities are increasing in popularity. Many of these smartphones include a mobile operating system ("OS") running on a mobile processor. While mobile processors and mobile OS's have increased the capabilities of these devices, smartphones have not tended to replace personal computer ("PC") environments (i.e., Windows, Mac OS X, Linux) such as desktop or notebook computers at least because of the limited user experience provided. In particular, the user interface device(s) found on smartphones are typically tailored to the mobile environment. For example, smartphones typically use a small thumb-style QWERTY keyboard, touch-screen display, click-wheel, and/or scroll-wheel as user interface devices. Mobile OSs, as well as applications (i.e., "Apps") developed for mobile OSs, are typically designed for the constraints of the mobile environment including a mobile processor and the user interface device(s) present on mobile devices. Therefore, many applications that have been developed for PC operating systems are not available for mobile OSs (i.e., are not compiled for and do not run on mobile OSs). In addition, for some tasks such as typing or editing documents, a full-size keyboard and large display are easier to use than the user interface components typically found on a smartphone.

Accordingly, users typically use separate computing devices for each computing experience, including a smartphone, tablet computer, laptop computer, and/or desktop computer. In this instance, each device has its own CPU, memory, file storage, and OS. Connectivity and file sharing between smartphones and other devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

Figure 1:
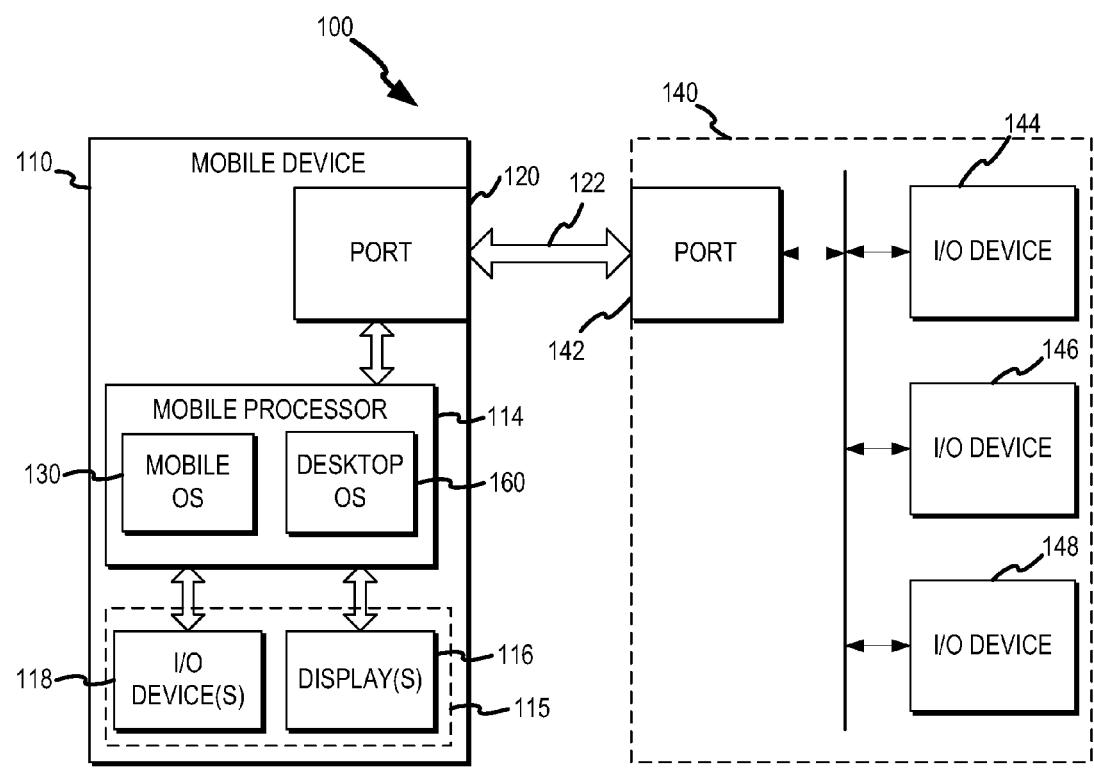
FIG. 1 illustrates a computing environment that provides multiple user computing experiences, according to various embodiments.

FIG. 1 illustrates a computing environment 100 that provides multiple user computing experiences with a mobile device that includes multiple operating systems associated with separate user interaction spaces (i.e., user environments), according to various embodiments. A first user interaction space 115 of computing environment 100 includes display(s) 116 and I/O devices 118 of mobile computing device 110. When mobile computing device 110 is operated as a stand-alone mobile device, mobile OS 130 presents a typical mobile computing user experience through user interaction space 115. The mobile computing experience provided by mobile OS 130 typically includes mobile telephony capabilities and a graphical user interface ("GUI") suited to user interaction space 115 including display(s) 116 and I/O device(s) 118. For example, display(s) 116 may be a touch-screen display(s) and application programs (i.e., "Apps") running on mobile OS 130 may be controlled primarily through a gesture-based GUI of mobile OS 130 using touch-screen display(s) 116.

In computing environment 100, mobile computing device 110 may be docked with secondary terminal environment 140 that includes I/O devices 144, 146, and/or 148. In embodiments, mobile computing device 110 is docked with secondary terminal environment 140 by connecting port 120 of mobile computing device 110 to port 142 of secondary terminal environment 140. In this instance, secondary terminal environment 140 presents a second user interaction space of computing environment 100. In some instances, the second user interaction space may be more suited to a desktop computing experience. In these instances, desktop OS 160 can be associated with secondary terminal environment 140 to provide the full capabilities of a notebook, tablet, or desktop computer environment through the second user interaction space.

In embodiments, mobile OS 130 and desktop OS 160 run concurrently on a shared kernel on a processor of mobile computing device 110. Concurrent execution of a mobile OS and a desktop OS on a shared kernel is described in more detail in U.S. patent application Ser. No. 13/217,108, filed Aug. 24, 2011, entitled "MULTI-OPERATING SYSTEM," herein incorporated by reference. In this way, a single mobile computing device can provide a mobile computing experience through a first user interaction space and a desktop computing experience through a second user interaction space. While the ability to carry one mobile device that can execute multiple operating systems concurrently through separate user interaction spaces solves a number of problems for a user, each user interaction space (through the concurrently running mobile OS and desktop OS) generally provides a separate set of available applications and user functionality.

Embodiments of the invention are directed to providing a seamless cross-environment workflow using multiple applications providing similar functionality running on separate, independent operating systems. Embodiments facilitate multiple applications sharing a single apparent user interaction state. In embodiments, a user can switch seamlessly from interacting with user content with an application running on a first OS (e.g., mobile OS 130) to interacting with the same user content with an application running on a second OS (e.g., desktop OS 160). Notably, application context information of the current user interaction state is maintained when the user switches to the second application, including application context information not typically stored as part of a document file for the applications.

Consider, for example, that a user is editing a document using a first word processing application running on a first OS through a first user environment. The user wishes to switch to editing the same document through a second user environment using a similar word processing application that runs on the second OS associated with the second user environment. For example, the user may have docked a mobile computing device with a second user environment and wishes to switch to editing the document with the second user environment. The user desires that the transition occur seamlessly, so they can pick up using the second application exactly where they left off with the first application, including any non-saved data and incomplete user actions. Handling this scenario involves managing user document files and application state information in a way that applications running in separate processes on separate operating systems present a single apparent application user interaction state.

Accordingly, embodiments provide various novel techniques for managing application state information and document files of multiple applications running on multiple separate operating systems. The embodiments include techniques for managing application state information for applications that primarily operate on local user content, client-server applications, and Internet-based applications.

As described above, computing environment 100 provides multiple user computing experiences through multiple user interaction spaces associated with a mobile device running multiple operating systems concurrently. Specifically, because mobile computing device 110 includes multiple OSs, where each OS is suited to a particular computing environment, mobile computing device 110 may be adapted with external I/O devices to provide a broad range of user experiences with a single mobile computing device. For example, a user may have a mobile computing device 110 and a secondary terminal environment 140 that includes a keyboard, display, and/or pointing device(s) in a laptop-type enclosure. When mobile computing device 110 is docked with this laptop-like secondary terminal environment, the full capabilities of desktop OS 160 are available through the secondary terminal environment 140.

Figure 2:
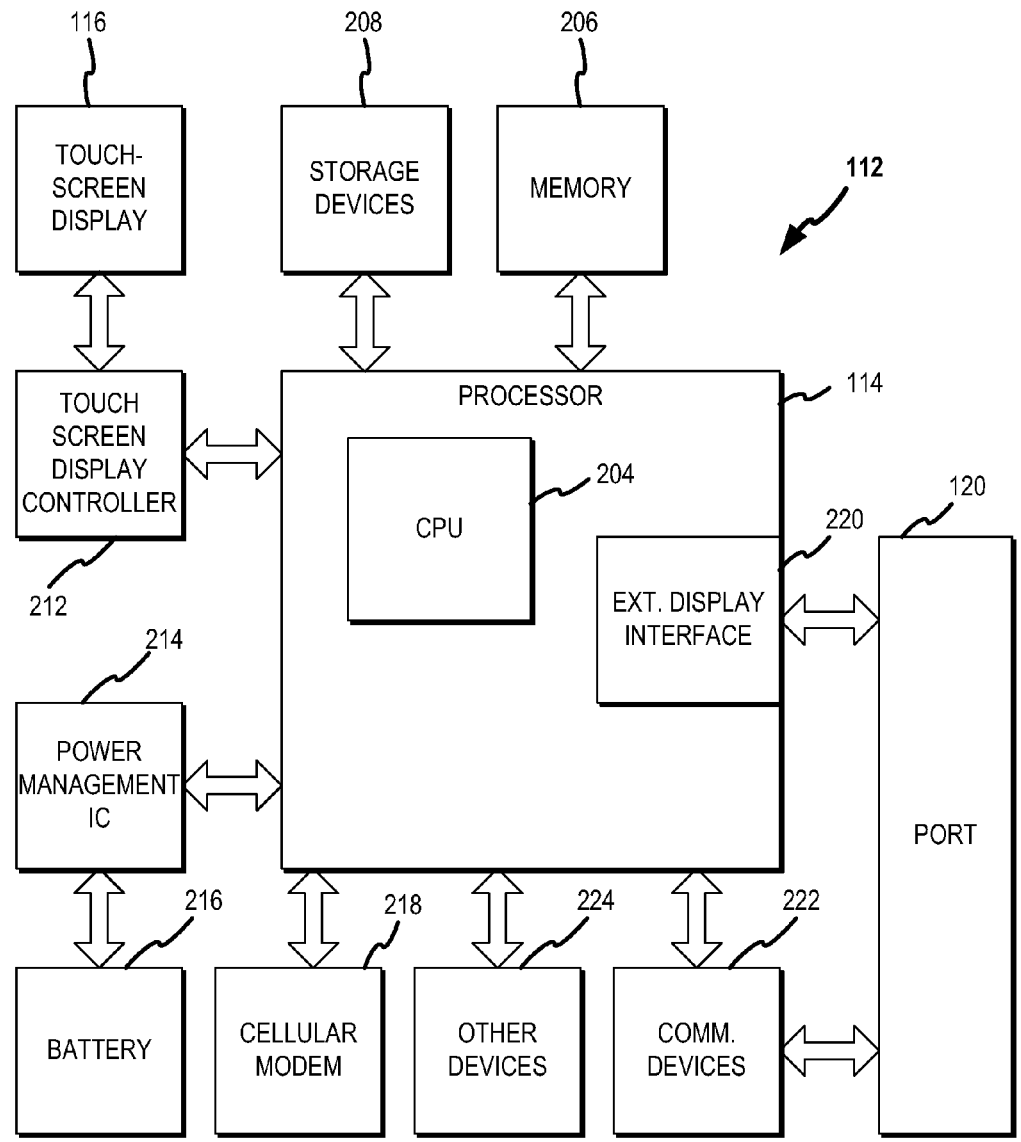
FIG. 2 illustrates an exemplary system architecture for a mobile computing device, according to various embodiments.

FIG. 2 illustrates an exemplary hardware system architecture for mobile computing device 110, according to various embodiments. Mobile computing device hardware 112 includes mobile processor 114 that includes one or more CPU cores 204 and external display interface 220. Generally, mobile computing device hardware 112 also includes I/O devices 118, memory 206, storage devices 208, touch-screen display controller 210 connected to touch-screen display 116, power management IC 214 connected to battery 216, cellular modem 218, communication devices 222, and/or other devices 224 that are connected to processor 114 through various communication signals and interfaces. I/O devices 118 generally includes buttons and other user interface components that may be employed in mobile computing device 110. For example, I/O devices 118 may include a set of buttons, (e.g., back, menu, home, search, etc.), off-screen gesture area, click-wheel, scroll-wheel, QWERTY keyboard, etc. Other devices 224 may include, for example, GPS devices, LAN connectivity, microphones, speakers, cameras, accelerometers, and/or MS/MMC/SD/SDIO card interfaces. External display interface 220 may be any suitable display interface (e.g., VGA, DVI, HDMI, etc.).

Processor 114 may be an ARM-based mobile processor. In embodiments, mobile processor 114 is a mobile ARM-based processor such as Texas Instruments OMAP3430, Marvell PXA320, Freescale iMX51, or Qualcomm QSD8650/8250. However, mobile processor 114 may be another suitable ARM-based mobile processor or processor based on other processor architectures such as, for example, x86-based processor architectures or other RISC-based processor architectures.

While FIG. 2 illustrates one exemplary hardware implementation 112 for mobile computing device 110, other architectures are contemplated as within the scope of the invention. For example, various components illustrated in FIG. 2 as external to mobile processor 114 may be integrated into mobile processor 114. Optionally, external display interface 220, shown in FIG. 2 as integrated into mobile processor 114, may be external to mobile processor 114. Additionally, other computer architectures employing a system bus, discrete graphics processor, and/or other architectural variations are suitable for employing aspects of the present invention.

Figure 3:
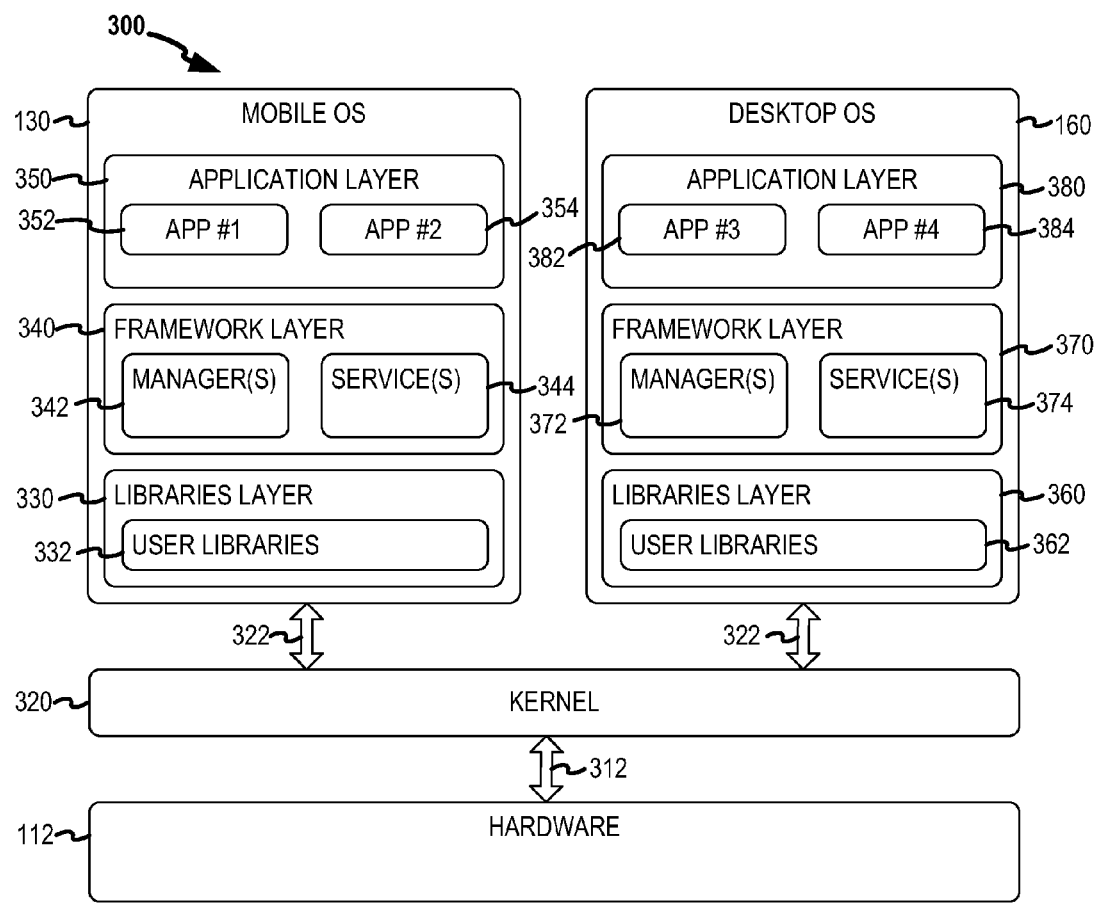
FIG. 3 illustrates an operating system architecture for a computing environment, according to various embodiments.

FIG. 3 illustrates OS architecture 300 that may be employed to run mobile OS 130 and desktop OS 160 concurrently on mobile computing device 110, according to various embodiments. As illustrated in FIG. 3, mobile OS 130 and desktop OS 160 are independent operating systems. Specifically, mobile OS 130 and desktop OS 160 may have independent and incompatible user libraries, graphics systems, and/or framework layers. Functions and instructions for OS architecture 300 may be stored as computer program code on a tangible computer readable medium of mobile computing device 110. For example, instructions for OS architecture 300 may be stored in storage device(s) 208 of mobile computing device hardware 112.

In OS architecture 300, mobile OS 130 and desktop OS 160 run concurrently on shared kernel 320. This means that mobile OS 130 and desktop OS 160 are running on shared kernel 320 at the same time. Specifically, mobile OS 130 and desktop OS 160 both interface to shared kernel 320 through the same kernel interface 322, for example, by making system calls to shared kernel 320. Shared kernel 320 manages task scheduling for processes of both mobile OS 130 and desktop OS 160. In this regard, mobile OS 130 and desktop OS 160 are running independently and concurrently on shared kernel 320. In addition, shared kernel 320 runs directly on mobile processor 114 of mobile computing device hardware 112, as illustrated by hardware interface 312. Specifically, shared kernel 320 directly manages the computing resources of mobile computing device hardware 112 such as CPU scheduling, memory access, and I/O. In this regard, hardware resources are not virtualized, meaning that mobile OS 130 and desktop OS 160 make system calls through kernel interface 322 without virtualized memory or I/O access.

As illustrated in FIG. 3, mobile OS 130 has libraries layer 330, application framework layer 340, and application layer 350. In mobile OS 130, applications 352 and 354 run in application layer 350 supported by application framework layer 340 of mobile OS 130. Application framework layer 340 includes manager(s) 342 and service(s) 344 that are used by applications running on mobile OS 130. For example, application framework layer 340 may include a window manager, activity manager, package manager, resource manager, telephony manager, gesture controller, and/or other managers and services for the mobile environment. Application framework layer 340 may include a mobile application runtime environment that executes applications developed for mobile OS 130. The mobile application runtime environment may be optimized for mobile computing resources such as lower processing power and/or limited memory space. The mobile application runtime environment may rely on the kernel for process isolation, memory management, and threading support. Libraries layer 330 includes user libraries 332 that implement common functions such as I/O and string manipulation, graphics functions, database capabilities, communication capabilities, and/or other functions and capabilities.

As illustrated in FIG. 3, desktop OS 160 has libraries layer 360, framework layer 370, and application layer 380. In desktop OS 160, applications 382 and 384 run in application layer 380 supported by application framework layer 370 of desktop OS 160. Application framework layer 370 includes manager(s) 372 and service(s) 374 that are used by applications running on desktop OS 160. For example, application framework layer 370 may include a window manager, activity manager, package manager, resource manager, and/or other managers and services common to a desktop environment. Libraries layer 360 may include user libraries 362 that implement common functions such as I/O and string manipulation, graphics functions, database capabilities, communication capabilities, and/or other functions and capabilities.

In various embodiments of the present disclosure, desktop OS 160 runs in a separate execution environment from mobile OS 130. For example, mobile OS 130 may run in a root execution environment and desktop OS 160 may run in a secondary execution environment established under the root execution environment. Processes and applications running on mobile OS 130 access user libraries 332, manager(s) 342 and service(s) 344 in the root execution environment. Processes and applications running on desktop OS 160 access user libraries 362, manager(s) 372 and service(s) 374 in the secondary execution environment.

In embodiments, mobile OS 130 and desktop 160 are independent operating systems with incompatible user libraries, graphics systems, and/or application frameworks. Therefore, applications developed for mobile OS 130 may not run directly on desktop OS 160, and applications developed for desktop OS 160 may not run directly on mobile OS 130. For example, application 352, running in application layer 350 of mobile OS 130, may be incompatible with desktop OS 160, meaning that application 352 could not run on desktop OS 160. Specifically, application 352 may depend on manager(s) 342, service(s) 344, and/or libraries 332 of mobile OS 130 that are either not available or not compatible with manager(s) 372, service(s) 374, and/or libraries 362 of desktop OS 160.

As a result, mobile OS 130 and desktop OS 160 may have different sets of available applications. In this regard, mobile OS 130 and desktop OS 160 of OS architecture 300 provide separate user experiences through separate sets of applications accessible through separate user interaction spaces. The user may access the applications available on (i.e., compiled for and loaded within the execution environment of) mobile OS 130 through a first user interaction space associated with mobile OS 130, and the applications available on desktop OS 160 through a second user interaction space associated with desktop OS 160.

As described above, mobile operating systems typically do not use the same graphics environment as desktop operating systems. Graphics environments for desktop OS's were designed for flexibility and high performance. For example, the X-window system, used by some desktop OSs, provides platform and network independence at the expense of greater processing and system resources. In contrast, graphics environments for mobile OSs are designed more for efficiency and the specific user input devices of a mobile computing environment and less for flexibility. Because the graphics environments of mobile and desktop OS's are often different, an application running on a mobile OS may not be re-directed to display within a user space of a desktop OS by re-directing the graphics information from the graphics server of the mobile OS to the graphics server of the desktop OS.

The most widely adopted mobile OS is Google's Android. While Android is based on Linux, it includes modifications to the kernel and other OS layers for the mobile environment and mobile processors. In particular, while the Linux kernel is designed for a PC (i.e., x86) CPU architecture, the Android kernel is modified for ARM-based mobile processors. Android device drivers are also particularly tailored for devices typically present in a mobile hardware architecture including touch-screens, mobile connectivity (GSM/EDGE, CDMA, Wi-Fi, etc.), battery management, GPS, accelerometers, and camera modules, among other devices. In addition, Android does not have a native X Window System nor does it support the full set of standard GNU libraries, and this makes it difficult to port existing GNU/Linux applications or libraries to Android.

Apple's iOS operating system (run on the iPhone) and Microsoft's Windows Phone 7 are similarly modified for the mobile environment and mobile hardware architecture. For example, while iOS is derived from the Mac OS X desktop OS, common Mac OS X applications do not run natively on iOS. Specifically, iOS applications are developed through a standard developer's kit ("SDK") to run within the "Cocoa Touch" runtime environment of iOS, which provides basic application infrastructure and support for key iOS features such as touch-based input, push notifications, and system services. Therefore, applications written for Mac OS X do not run on iOS without porting. In addition, it may be difficult to port Mac OS X applications to iOS because of differences between user libraries and/or application framework layers of the two OSs, and/or differences in system resources of the mobile and desktop hardware.

Figure 4:
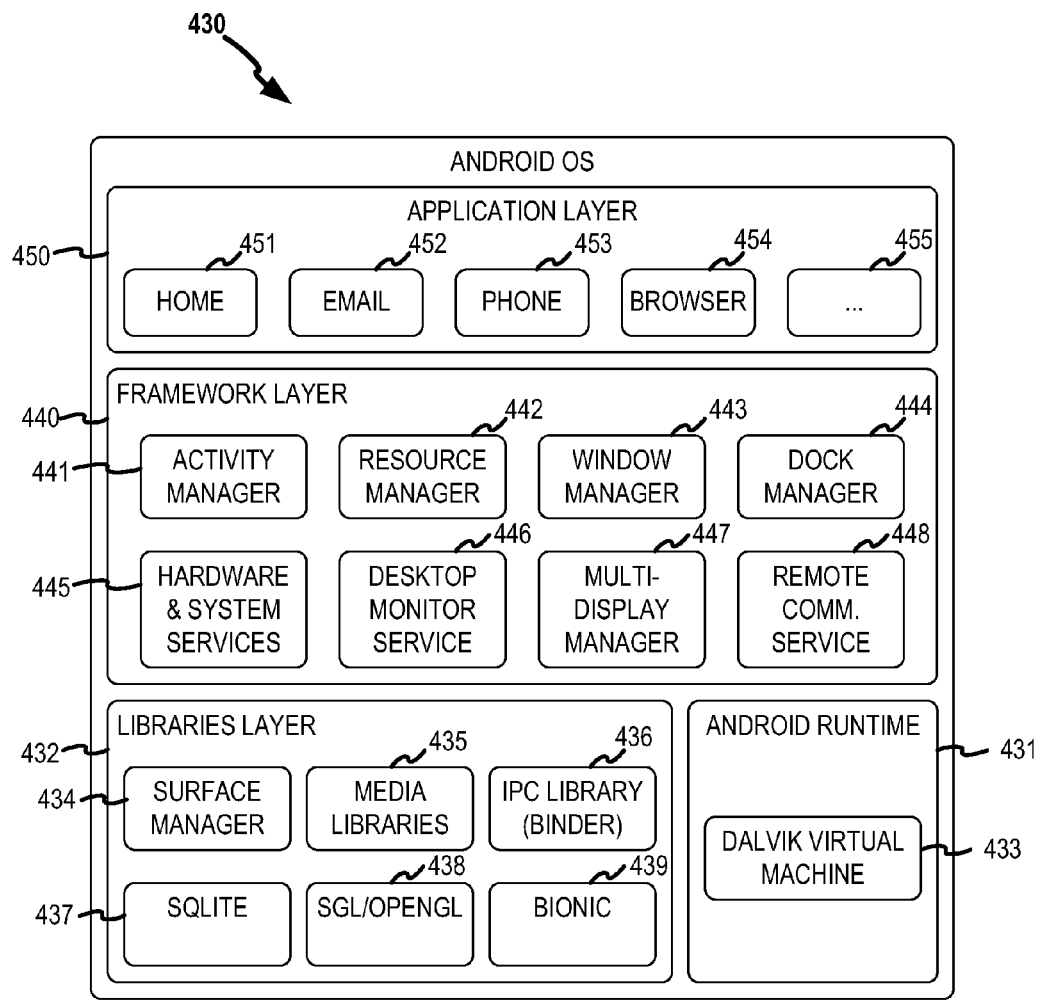
FIG. 4 illustrates a mobile operating system architecture that may be employed in a multiple operating system computing environment, according to various embodiments.
Figure 5:
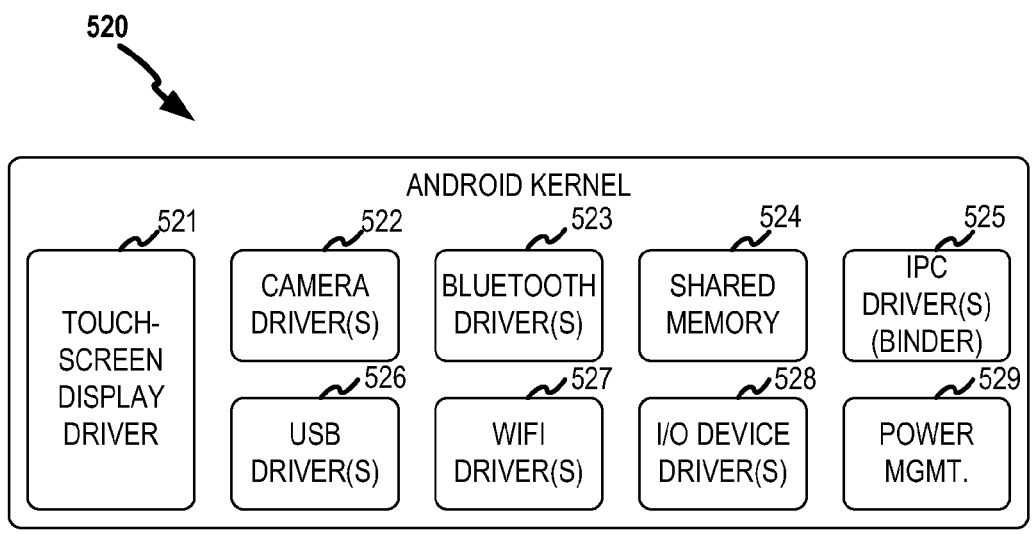
FIG. 5 illustrates aspects of an operating system architecture for a computing environment, according to various embodiments.
Figure 6:
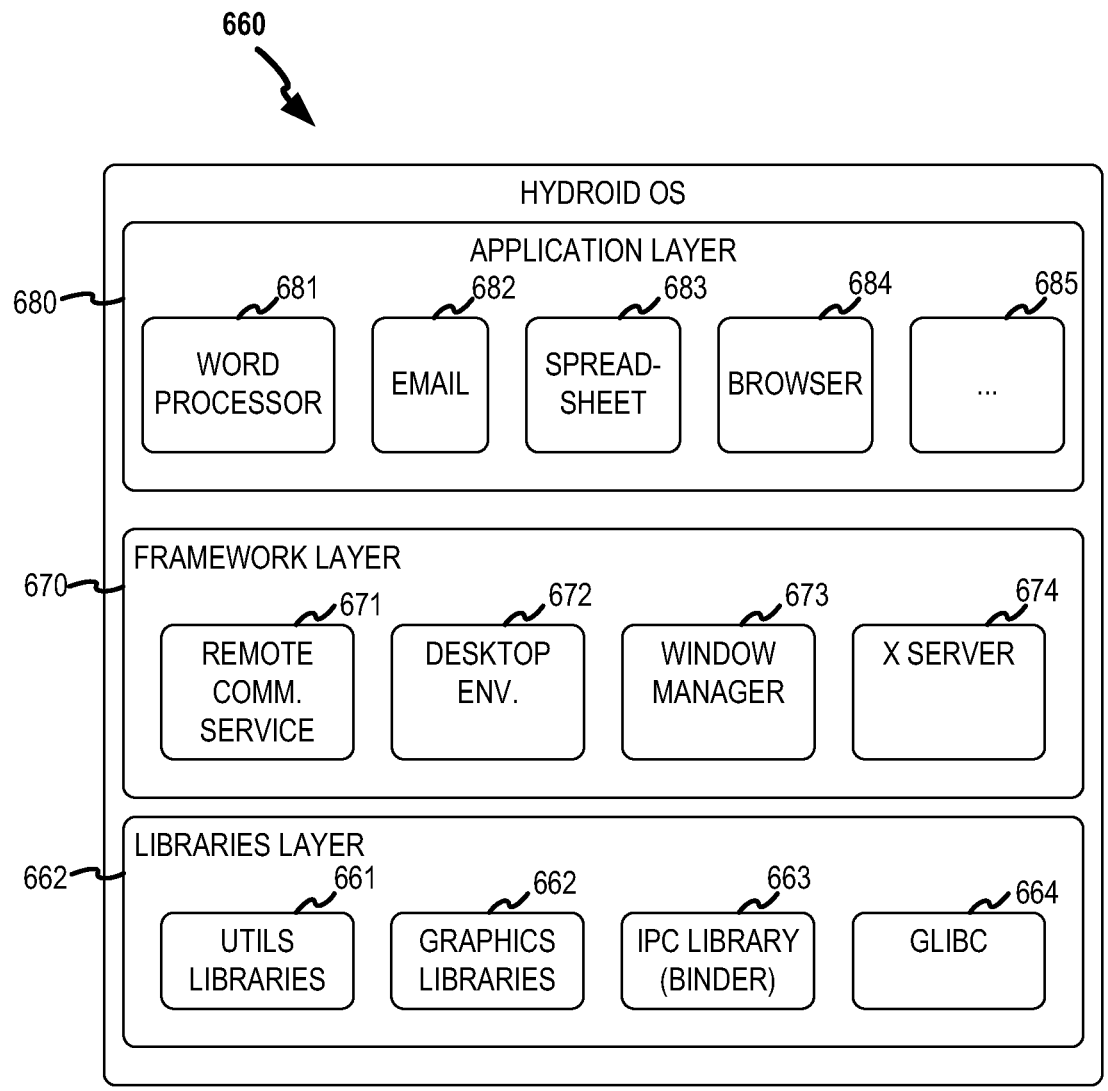
FIG. 6 illustrates a mobile operating system architecture that may be employed in a multiple operating system computing environment, according to various embodiments.

In one embodiment consistent with OS architecture 300, an Android mobile OS and a full Linux OS run independently and concurrently on a modified Android kernel. In this embodiment, the Android OS may be a modified Android distribution while the Linux OS ("Hydroid") may be a modified Debian Linux desktop OS. FIGS. 4-6 illustrate Android mobile OS 430, Android kernel 520, and Hydroid OS 660 that may be employed in OS architecture 300 in more detail, according to various embodiments.

As illustrated in FIG. 4, Android OS 430 includes a set of C/C++ libraries in libraries layer 432 that are accessed through application framework layer 440. Libraries layer 432 includes the "bionic" system C library 439 that was developed specifically for Android to be smaller and faster than the "glibc" Linux C-library. Libraries layer 432 also includes inter-process communication ("IPC") library 436, which includes the base classes for the "Binder" IPC mechanism of the Android OS. Binder was developed specifically for Android to allow communication between processes and services. Other libraries shown in libraries layer 432 in FIG. 4 include media libraries 435 that support recording and playback of media formats, surface manager 434 that managers access to the display subsystem and composites graphic layers from multiple applications, 2D and 3D graphics engines 438, and lightweight relational database engine 437. Other libraries that may be included in libraries layer 432 but are not pictured in FIG. 4 include bitmap and vector font rendering libraries, utilities libraries, browser tools (i.e., WebKit, etc.), and/or secure communication libraries (i.e., SSL, etc.).

Application framework layer 440 of Android OS 430 provides a development platform that allows developers to use components of the device hardware, access location information, run background services, set alarms, add notifications to the status bar, etc. Framework layer 440 also allows applications to publish their capabilities and make use of the published capabilities of other applications. Components of application framework layer 440 of Android mobile OS 430 include activity manager 441, resource manager 442, window manager 443, dock manager 444, hardware and system services 445, desktop monitor service 446, multi-display manager 447, and remote communication service 448. Other components that may be included in framework layer 440 of Android mobile OS 430 include a view system, telephony manager, package manager, location manager, and/or notification manager, among other managers and services.

Applications running on Android OS 430 run within the Dalvik virtual machine 431 in the Android runtime environment 433 on top of the Android object-oriented application framework. Dalvik virtual machine 431 is a register-based virtual machine, and runs a compact executable format that is designed to reduce memory usage and processing requirements. Applications running on Android OS 430 include home screen 451, email application 452, phone application 453, browser application 454, and/or other application(s) ("App(s)") 455.

The Android OS graphics system uses a client/server model. A surface manager ("SurfaceFlinger") is the graphics server and applications are the clients. SurfaceFlinger maintains a list of display ID's and keeps track of assigning applications to display ID's. In one embodiment, mobile computing device 110 has multiple touch screen displays 116. In this embodiment, display ID 0 is associated with one of the touch screen displays 116 and display ID 1 is associated with the other touch screen display 116. Display ID 2 is associated with both touch screen displays 116 (i.e., the application is displayed on both displays at the same time). Display ID's greater than 2 are virtual displays, meaning that they are not associated with a display physically present on mobile computing device hardware 112.

Graphics information for Android applications includes windows, views, and canvasses. Each window, view, and/or canvas is implemented with an underlying surface object. Surface objects are double-buffered (front and back buffers) and synchronized across processes for drawing. SurfaceFlinger maintains all surfaces in a shared memory pool which allows all processes within Android to access and draw into them without expensive copy operations and without using a server-side drawing protocol such as X-Windows. Applications always draw into the back buffer while SurfaceFlinger reads from the front buffer. SurfaceFlinger creates each surface object, maintains all surface objects, and also maintains a list of surface objects for each application. When the application finishes drawing in the back buffer, it posts an event to SurfaceFlinger, which swaps the back buffer to the front and queues the task of rendering the surface information to the frame buffer.

SurfaceFlinger monitors all window change events. When one or more window change events occur, SurfaceFlinger renders the surface information to the frame buffer for one or more displays. Rendering includes compositing the surfaces, i.e., composing the final image frame based on dimensions, transparency, z-order, and visibility of the surfaces. Rendering may also include hardware acceleration (e.g., OpenGL 2D and/or 3D interface for graphics processing hardware). SurfaceFlinger loops over all surface objects and renders their front buffers to the frame buffer in their Z order.

FIG. 5 illustrates modified Android kernel 520 in more detail, according to various embodiments. Modified Android kernel 520 includes touch-screen display driver 521, camera driver(s) 522, Bluetooth driver(s) 523, shared memory allocator 524, IPC driver(s) 525, USB driver(s) 526, WiFi driver(s) 527, I/O device driver(s) 528, and/or power management module 530. I/O device driver(s) 528 includes device drivers for external I/O devices, including devices that may be connected to mobile computing device 110 through port 120. Modified Android kernel 520 may include other drivers and functional blocks including a low memory killer, kernel debugger, logging capability, and/or other hardware device drivers.

FIG. 6 illustrates Hydroid OS 660 in more detail, according to various embodiments. Hydroid is a full Linux OS that is capable of running almost any application developed for standard Linux distributions. In particular, libraries layer 662 of Hydroid OS 660 includes Linux libraries that support networking, graphics processing, database management, and other common program functions. For example, user libraries 662 may include the "glibc" Linux C library 664, Linux graphics libraries 662 (e.g., GTK, OpenGL, etc.), Linux utilities libraries 661, Linux database libraries, and/or other Linux user libraries. Applications run on Hydroid within an X-Windows Linux graphical environment using X-Server 674, window manager 673, and/or desktop environment 672. Illustrated applications include word processor 681, email application 682, spreadsheet application 683, browser 684, and other application(s) 685.

The Linux OS graphics system is based on the X-windows (or "X11") graphics system. X-windows is a platform-independent, networked graphics framework. X-windows uses a client/server model where the X-server is the graphics server and applications are the clients. The X-server controls input/output hardware associated with the Linux OS such as displays, touch-screen displays, keyboards, pointing device(s), etc. In this regard, X-windows provides a server-side drawing graphics architecture, i.e., the X-server maintains the content for drawables including windows and pixmaps. X-clients communicate with the X-server by exchanging data packets that describe drawing operations over a communication channel. X-clients access the X communication protocol through a library of standard routines (the "Xlib"). For example, an X-client may send a request to the X-server to draw a rectangle in the client window. The X-server sends input events to the X-clients, for example, keyboard or pointing device input, and/or window movement or resizing. Input events are relative to client windows. For example, if the user clicks when the pointer is within a window, the X-server sends a packet that includes the input event to the X-client associated with the window that includes the action and positioning of the event relative to the window.

Because of the differences in operating system frameworks, graphics systems, and/or libraries, applications written for Android do not generally run on Hydroid OS 660 and applications written for standard Linux distributions do not generally run on Android OS 430. In this regard, applications for Android OS 430 and Hydroid OS 660 are not bytecode compatible, meaning compiled and executable programs for one do not run on the other.

In one embodiment, Hydroid OS 660 includes components of a cross-environment communication framework that facilitates communication with Android OS 430 through shared kernel 520. These components include IPC library 663 that includes the base classes for the Binder IPC mechanism of the Android OS and remote communications service 671.

In one embodiment, Hydroid OS 660 is run within a chrooted (created with the 'chroot' command) secondary execution environment created within the Android root environment. Processes and applications within Hydroid OS 660 are run within the secondary execution environment such that the apparent root directory seen by these processes and applications is the root directory of the secondary execution environment. In this way, Hydroid OS 660 can run programs written for standard Linux distributions without modification because Linux user libraries 662 are available to processes running on Hydroid OS 660 in the chrooted secondary execution environment.

Referring back to FIG. 3, mobile OS 130 and desktop 160 are in active concurrent execution on shared kernel 320 on a mobile device. Mobile OS 130 and desktop OS 160 may be incompatible with regard to user libraries, graphics systems, and/or application frameworks. This means that an application compiled for one OS (i.e., compiled against the user libraries, etc., of that OS) will not execute on the other OS. Accordingly, mobile OS 130 and desktop OS 160 of OS architecture 300 provide separate user experiences through different applications accessible through separate user interaction spaces.

In some instances, an application may be available for mobile OS 130 that provides similar functionality to an application available for desktop OS 160. These applications, while separate applications compiled for different OSs, may be compatible from the standpoint of user data including document files. Examples of applications available on (compiled for and loaded within the execution environment of) both OSs may include web browsers, email client applications, office productivity applications (e.g., word processing, spreadsheet, presentation, etc.), photo and video editing applications, and/or other applications. Consequently, it may be possible for a user to edit a certain document file using a first application running on mobile OS 130, and later edit the same document file using a second application running on desktop OS 160. However, this does not provide a seamless user experience. To switch between editing the document file with the first application and editing the document using the second application, the user must close the document file with the first application, launch the second application on the desktop OS, and re-open the document file with the second application. In this process, the user loses any application state information related to their current state of use of the first application not saved in the document file. This may include, for example, the current editing or cursor position, the current view, undo information, the current editing mode (e.g., viewing with markup or without, etc.), currently selected text, selected menu tabs, application options (open toolbars, printing options, etc.).

Embodiments of the present invention extend the functionality of OS architecture 300 to provide a more seamless computing experience in a multi-OS computing environment by sharing application state information across applications executing on different OSs such that they provide a single apparent application interaction state. This functionality enables, for example, a user to seamlessly switch from interacting with a set of user data using a first application running in a first OS to interacting with the same set of user data using a second application running in a second OS. Notably, the current user interaction state is maintained to provide a seamless cross-environment workflow. This means that the user does not have to close application documents associated with the user data before switching to interacting with the user data using the second application. Further, application interaction state information that may not be part of an application document file is maintained across the separate applications running on separate OSs. For example, user selected objects or text may be maintained across applications running in separate OSs such that a user can begin a user action on a set of user data with an application running in a first OS, and complete the action with an application running on a second, separate OS.

To provide a seamless cross-environment workflow, the embodiments described below provide methods and systems that allow two or more application programs running in independent operating systems to share user interaction state information. The embodiments provide for sharing user interaction state information across applications running in two or more separate operating systems. Shared user interaction state information may include user data, user settings, and/or application context information. In this way, two or more applications, compiled for and running on separate OSs, can present a single apparent user interaction state.

Figure 7:
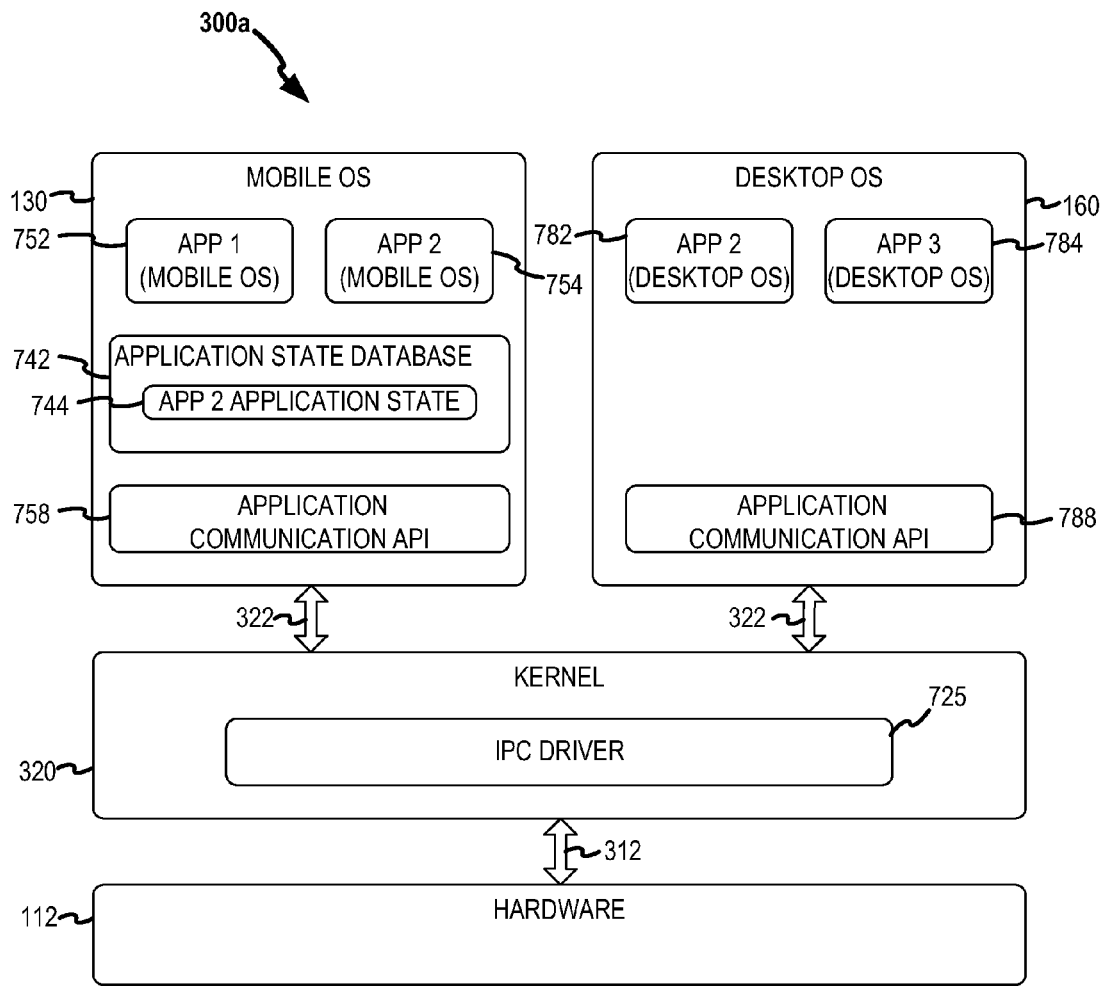
FIG. 7 illustrates a multiple operating system computing environment for providing translation of application data, user settings, and/or application context across applications running in separate operating systems, according to various embodiments.

FIG. 7 illustrates computing environment 300a which extends computing environment 300 illustrated in FIG. 3 to provide seamless translation of application data, user settings, and/or application context across applications running in separate operating systems. In computing environment 300a, applications 752 and 754 are compiled for and running on mobile OS 130. Applications 782 and 784 are compiled for and running in desktop OS 160, which runs concurrently with mobile OS 130 on shared kernel 320. One or more applications available on mobile OS 130 may include functionality for seamless translation of application data with a corresponding application available on desktop OS 160. For example, application 754 of mobile OS 130 may be a word processing application compiled for mobile OS 130. Application 782 of desktop OS 160 may be a compatible (i.e., compatible document file types) word processing application compiled for desktop OS 160. Computing environment 300a includes functionality for providing seamless translation of a current application interaction state including application data, application user settings, and/or application context information across the applications.

In computing environment 300a, application state information is stored within application state data store 742 of mobile OS 130. While application state data store is illustrated as a component of mobile OS 130, application state data store 742 may alternatively be a component of desktop OS 160. Application state data store 742 is accessible by applications within mobile OS 130 and applications within desktop OS 160. In one embodiment, application state data store 742 is a database maintained by a service of mobile OS 130. Communication between applications running on desktop OS 160 with the application state data store is provided through an inter-process communication channel 725 of shared kernel 320. A cross-environment communication framework that provides a communication channel for applications of desktop OS 160 to communicate with services and applications of mobile OS 130 is described in more detail in co-pending U.S. patent application Ser. No. 13/217,099, filed Aug. 24, 2011, entitled "Cross-Environment Communication Framework," and Ser. No. 13/247,885, filed Sep. 28, 2011, entitled "Cross-Environment Communication Using Application Space API," the entire contents of each of which are incorporated herein by reference. However, any suitable inter-process communication mechanism may be used to provide access to application state data store by processes running on desktop OS 160.

In the embodiment illustrated by FIG. 7, computing environment 300a includes application communication API 758 of mobile OS 130 and application communication API 788 of desktop OS 160. Application communication API 758 and application communication API 788 provide the low-level functions for applications to communicate with application state data store 742 to set and query application state information. Using these functions, mobile OS applications call down to application communication API 758 to set and query application state data. For example, application 754 calls functions of API 758 with name/value pairs to set and query application state data. Desktop OS applications call down to application communication API 788 to set and query application state data from application state data store 742.

The application communication APIs of computing environment 300a may be in application space within the first and/or second OS. For example, API 758 could be implemented as a runtime library of mobile OS 130. In one embodiment, API 758 is implemented as a JAR file for a Dalvik runtime environment of an Android mobile OS. In other embodiments, the application communication APIs of computing environment 300a may be within user libraries or other libraries accessible to applications of the OS. For example, in one embodiment, API 788 of desktop OS 160 is implemented as a shared user library in a Linux OS.

In alternative embodiments, computing environment does not include APIs in mobile OS 130 and desktop OS 160. In these embodiments, the applications communicate directly with the application state data store to set and query application state information. Applications of mobile OS 130 and desktop OS 160 may also communicate to the application state data store through a service of mobile OS 130 or desktop OS 160.

Figure 8:
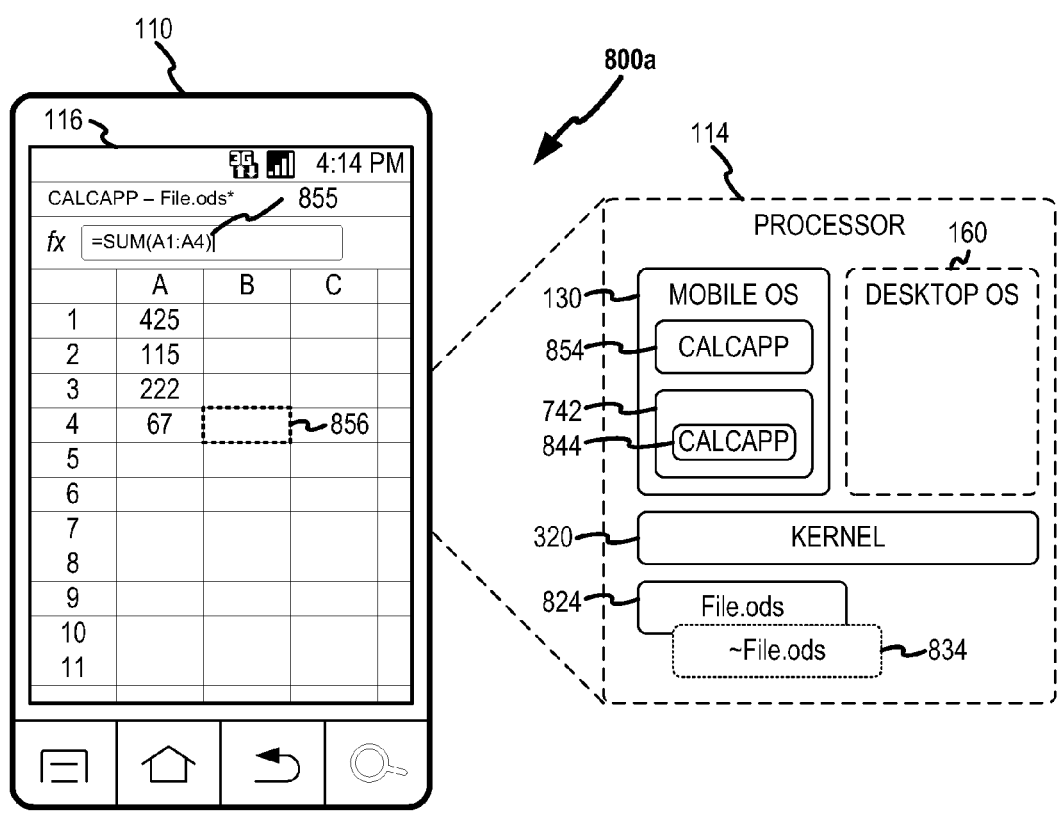
FIG. 8 illustrates a computing environment configuration, according to various embodiments.
Figure 9:
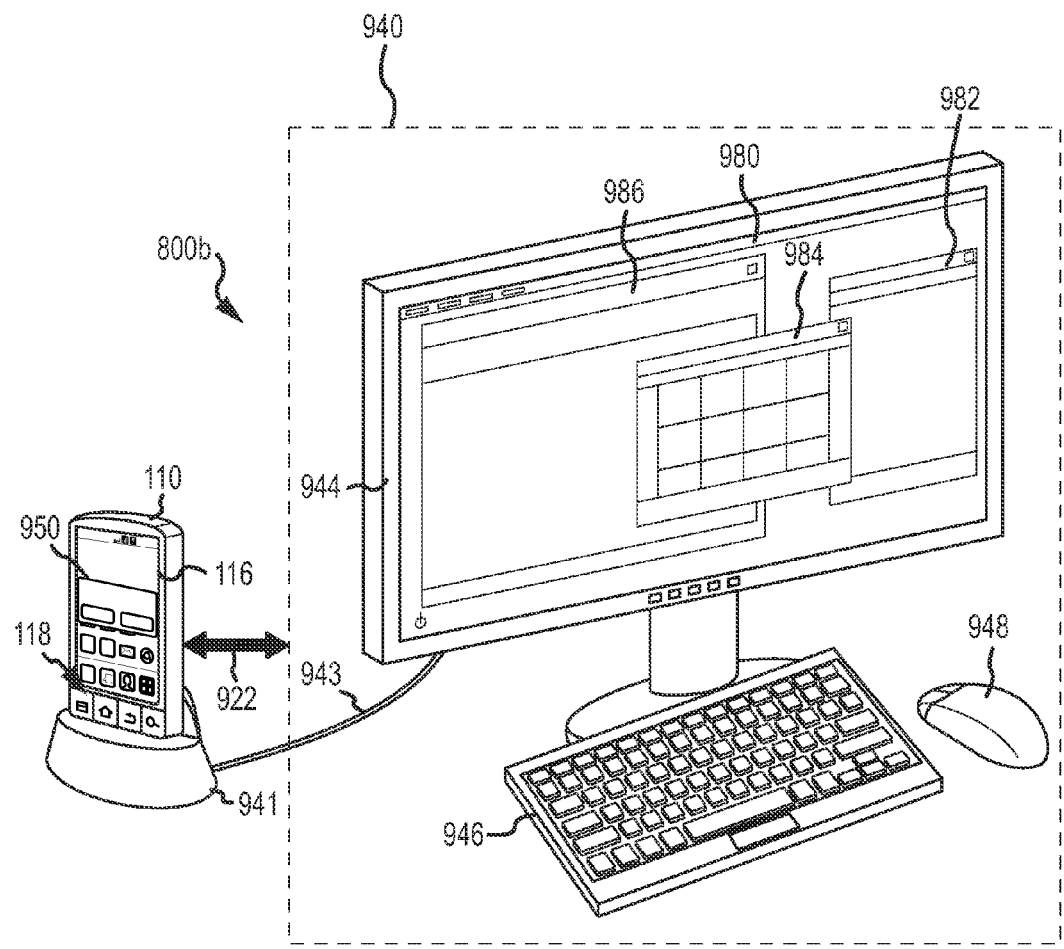
FIG. 9 illustrates a computing environment configuration in which a mobile computing device is docked with a secondary terminal environment, according to various embodiments.
Figure 10:
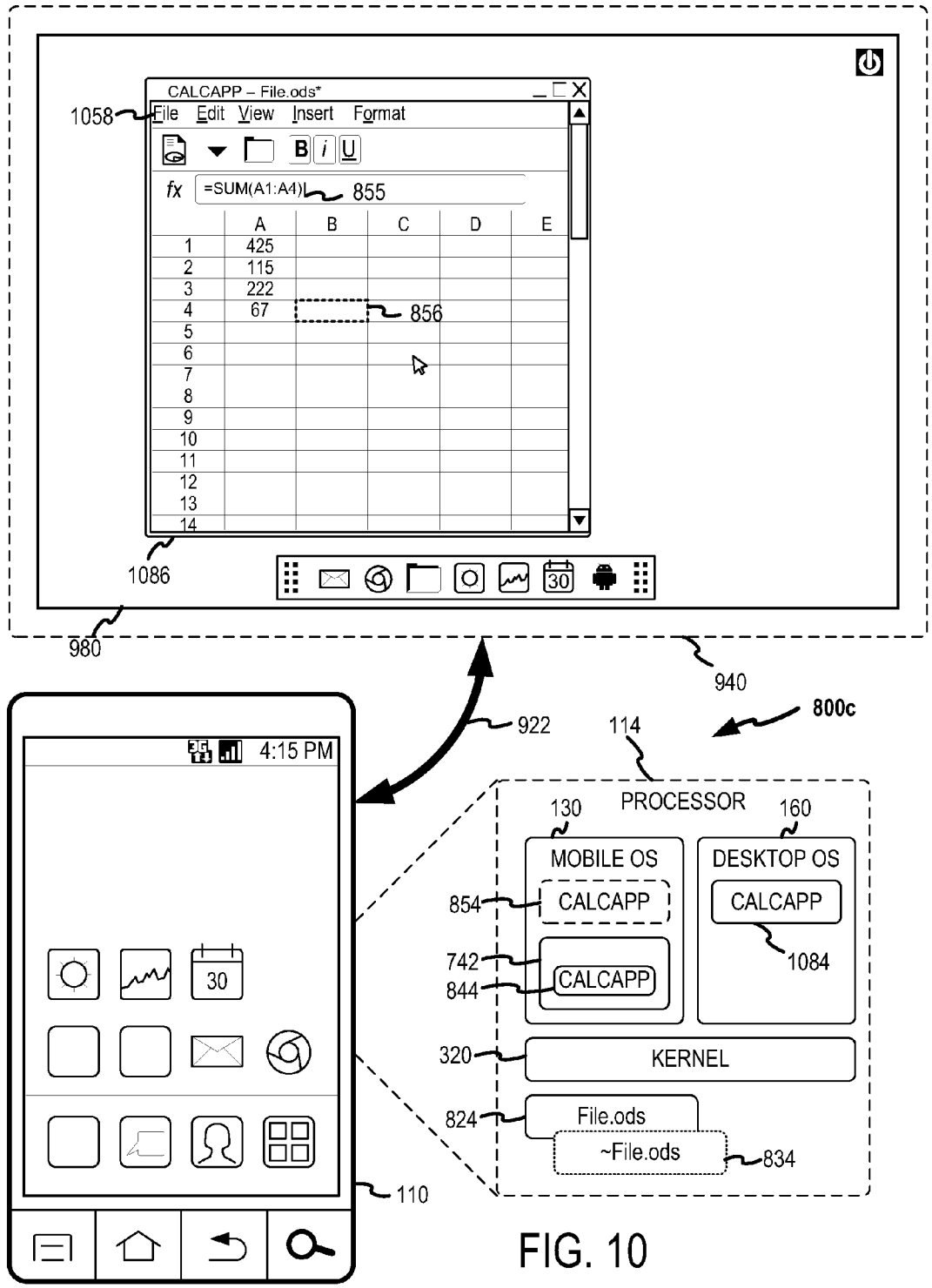
FIG. 10 illustrates a computing environment configuration that shows how aspects of the computing environment of FIG. 7 provide a seamless workflow across multiple applications running on separate operating systems, according to various embodiments.

FIGS. 8-10 illustrate how computing environment 300a allows a seamless cross-environment workflow, according to various embodiments. In a first computing environment configuration 800a illustrated in FIG. 8, a user is actively interacting with a set of information (e.g., spreadsheet document) using a first spreadsheet application ("CALCAPP") running on mobile OS 130 on mobile device 110. Desktop OS 160 is running concurrently on the mobile device (on processor 114 of the mobile device 110) with mobile OS 130 on shared kernel 320. The current user interaction state of the first spreadsheet application includes user content, user settings, and an application context.

User content may include the data and formatting of the data that the user is editing. User content may be stored in a document file 824 stored on a non-volatile storage medium of the mobile computing device. A temporary document file 834 may also contain user content. In various embodiments, temporary document file 834 includes user content that has not been saved to document file 824 by the user. For example, temporary document file 834 may include the changes made to the user document since it was last saved to document file 824 by the user.

It is worth noting that the document file 824 and/or the temporary document file 834 can alternatively be stored remote to the mobile computing device. For example, embodiments may store some or all of the data in external storage (e.g., an external hard drive, a thumb drive, etc.), on a remote server accessible to the mobile computing device over a local or non-local network, on remote (e.g., "cloud") storage accessible to the mobile computing device over the public Internet, or in any other useful location. Other embodiments store some files locally and others non-locally. Still other embodiments locally store copies (e.g., temporary versions, etc.) of non-local files and provide additional functionality to synchronize those files (e.g., or keep track of revisions, perform other file management tasks, etc.). Accordingly, embodiments described herein with reference to locally stored files are intended to be applicable to applications storing some or all of their files in non-local storage. In some cases, handling of remote files is facilitated by client-server interactions, or the like, as discussed more fully below.

User settings include user selected options, such as, for example, default document formatting and views, visible menus, hotkeys, document review options, proofing options, and/or user customizations. Typically, document specific settings and options are stored in the document file while other options may be stored in a file associated with the application program. In computing environment 300a, options that are typically stored in the file associated with the application program may be stored in application state data store 742.

The application context includes additional information that defines the current user interaction state of the application. For example, application context information not typically stored in a document or user settings file may include the current cursor position, selected text or objects, previous user actions (e.g., undo levels and actions), current view, selected menu tab, and/or other information. In computing environment configuration 800a, application context information includes cursor position 855 and selected cell 856. This application context information is maintained in application state data store 742, and is represented in computing environment configuration 800a by application state 844. In addition, the user has entered data since last saving document file 824. For example, the user may have entered a formula in computing environment configuration 800a since last saving the user document. This information is stored in temporary document file 834.

After some time period of interacting with the set of information using the first spreadsheet application on the mobile device, the user docks the mobile device with a second user environment (e.g., desktop user environment). For example, FIG. 9 illustrates computing environment configuration 800b in which mobile computing device 110 is docked with secondary terminal environment 940, according to various embodiments. Secondary terminal environment 940 includes display 944, keyboard 946, and pointing device 948. In this regard, secondary terminal environment 940 is a desktop-like terminal environment. When docked through dock interface 922, the mobile device associates desktop OS 160 with secondary terminal environment 940 such that the user interface 980 of the desktop OS is displayed on the display 944 of the second user environment 940. As illustrated in FIG. 9, dock interface 922 may include a dock cradle 941 and/or dock cable 943.

In this instance, the user wishes to continue to interact with the same user content (i.e., spreadsheet data represented by file 'File.ods') using an application that is tailored to the context of the second user environment, without losing the current user interaction state. For example, while compatible from the standpoint of document file types, applications available for the mobile OS may differ in some respects to applications available for the desktop OS. These differences may include the screen resolution, menus, visible document area, functionality, etc. For these reasons, it may be easier for the user to edit user content using the desktop OS application when the mobile computing device is docked to a secondary terminal environment.

FIG. 10 illustrates computing environment configuration 800c that shows how aspects of computing environment 700 provide a seamless workflow across multiple applications running on separate operating systems, according to various embodiments. When the user docks mobile computing device 110 to secondary terminal environment 940, the first spreadsheet application 854 closes document file 824 and temporary document file 834 and shuts down or suspends (no longer uses computing resources of mobile OS 130) as illustrated in FIG. 10 by a dashed outline. Application 1084 launches on desktop OS 160 and accesses application state data store 742 to retrieve the current user interaction state of application 854 (i.e., the user interaction state of application 854 just before mobile computing device 110 was docked with secondary terminal environment 940).

As described above, the user interaction state information 844 includes user content, user settings, and application context information. User interaction state information 844 includes pointers to document file 824 and temporary file 834 that contain the user content information. The second spreadsheet application opens the document file 824 and temporary document file 834, and queries the application state information 844 for user settings and application context information. For example, the second application retrieves the cursor position 855 and active cell 856, among other application context information. Accordingly, the second spreadsheet application 1084 presents an application window 1086 on the secondary terminal environment that allows the user to seamlessly pick up interacting with spreadsheet user data exactly where they left off with the first application 854. Using a similar process, the user may switch back to editing user data using the first spreadsheet application 854 running on the mobile OS when the user undocks the mobile computing device.

It is not necessary for a first application running on a first OS to have exactly the same user interface as a second application running on a second OS to present a single apparent user interaction state using the above embodiments. For example, the user interface style, way of interacting with the user interface, and/or user interface components may be different while still considered to be presenting a single apparent user interaction state. In particular, each application may be tailored to the context of the operating system on which it is running as well as the user environment on which it is displayed, while sharing a single apparent user interaction state. For example, mobile applications may be tailored to the touch-based user input and smaller display screen present on typical mobile computing environments. In contrast, desktop applications may be tailored to larger screens and pointing device(s) based input. For example, a desktop word-processing application may have more visible menus and menu icons that does a word-processing application designed for a mobile OS GUI. However, using the embodiments described above, application context information may be shared to provide a single apparent user interaction state that provides, to the user, a seamless workflow for editing user content using either the mobile application or the desktop application.

In the embodiment described above, switching between applications running on separate operating systems and sharing application state information occurred automatically based on an event (e.g., docking, undocking, etc.). That is, the computing environment assumed that the user intends to switch to the desktop application when the user docks the mobile device. However, switching between applications with which the user is actively interacting may occur as a result of a user prompt, or based on user settings. For example, when the user docks the mobile device, the user could be prompted to determine whether they want to continue to interact with the first application running on the mobile OS, or switch to interacting with the same user data through a second application running on the desktop OS. Alternatively, user settings could determine that for some applications the user wants to switch automatically when the mobile device is docked, while for other applications the user either wants to be prompted or does not want to switch to the desktop application.

In embodiments, applications running on separate OSs and sharing a single apparent user interaction state may both be running at the same time. For example, application 854, running on mobile OS 130 may be running and presenting a user application window through the user environment associated with mobile OS 130. At the same time, application 1084 is running on desktop OS 160 and presenting application window 1086 on a second user environment associated with desktop OS 160. In this instance, applications 854 and 1084 may share user settings and application context information as described above. When application context information is changed (i.e., the user interaction state is updated) in response to a user input to one of applications 854 and 1084, the application context information is updated in application state data store 742. Application state data store 742 pushes the change to the other application through a notification channel such that the other application maintains a consistent user interaction state with the first application. For concurrently running applications on separate operating systems, releasing locks on document file 824 and temporary document file 834 may be done in several ways. In one embodiment, document files are released or established in response to user input in one of the concurrently running applications.

Figure 11:
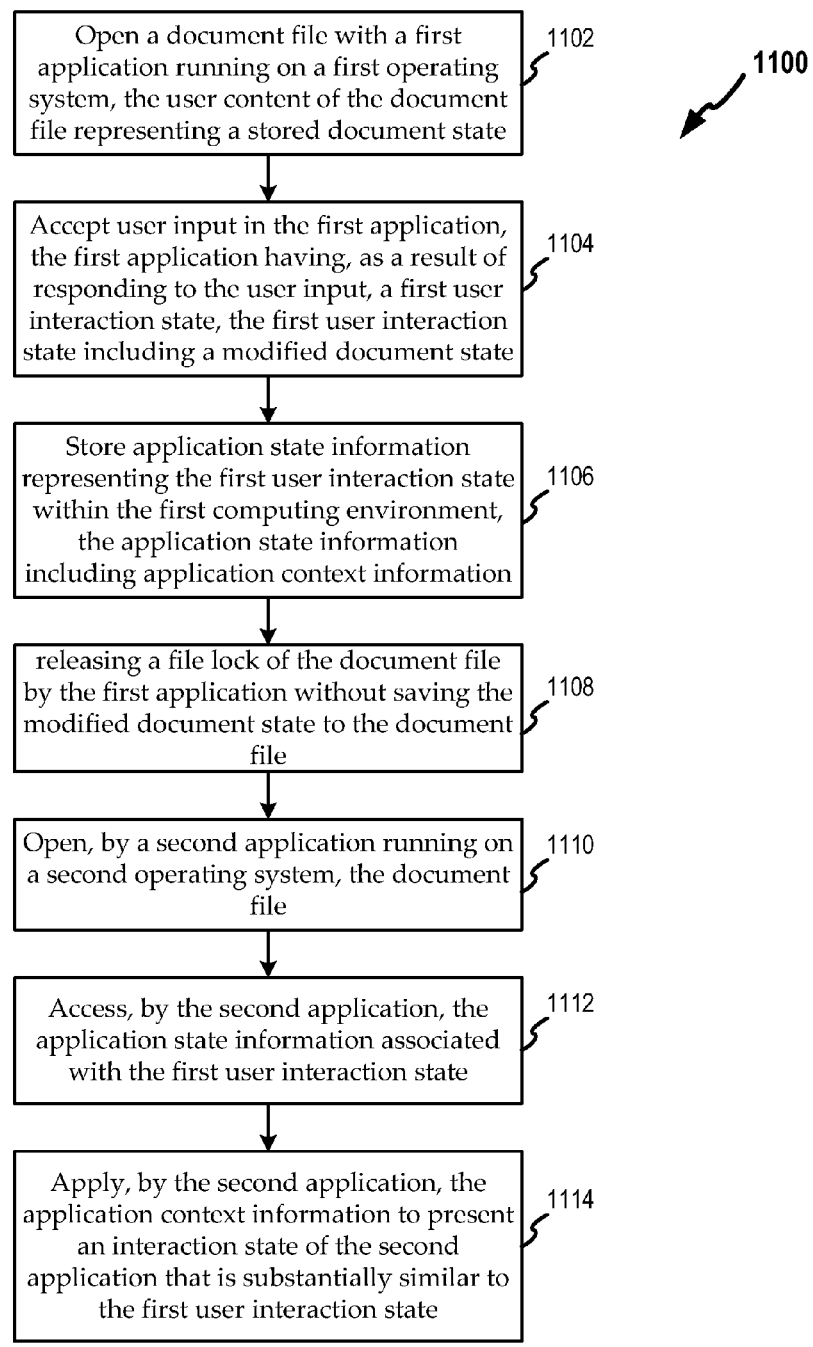
FIG. 11 illustrates an exemplary process flow for translation of application data between separate applications running on independent operating systems and displayed in separate user environments, according to various embodiments.

FIG. 11 illustrates a process flow 1100 for seamless translation of application data between separate applications displayed in separate user environments (e.g., running on independent operating systems, each operating system associated with a separate user environment), according to various embodiments. Process flow 1100 begins at block 1102, where a first application running on a first operating system opens a document file, the user content of the document file representing a store documents state. At block 1104, the first application accepts user input, and, as a result of this user input, has a first user interaction state. In this first user interaction state, the document has a modified document state. That is, the user document has been changed by the user to become a modified user document. At block 1106, application state information representing the first user interaction state is stored within the first computing environment, the application state information including application context information. At block 1108, the first application releases a file lock of the document file without saving the modified document state to the document file. At block 1110, a second application running on a second operating system opens the document file. At block 1112, the second application accesses the application state information associated with the first user interaction state. At block 1114, the second application applies the application context information to present an interaction state of the second application that is substantially similar to the first user interaction state. As a result of applying the application context information, the modified document has been transitioned from the first application, running on a first OS, to the second application, running on a second OS, with the application context maintained. That is, the user does not lose their current working application state, without having to save, close, and reopen the file, and without losing application context information not saved in the document file.

Seamless translation of application data between applications running on separate operating systems presents different issues for different types of applications. The description provided above shows how a seamless workflow may be provided across applications running on multiple separate operating systems for a category of applications that are used primarily to create and modify local user content. This category includes, for example, word processing applications, spreadsheet applications, presentation applications, and photo and video editing applications, among others.

Another category of applications includes applications that include, as a primary aspect, communication with a remote server. These applications may be said to be client-server type applications. For example, this category can include client-server communication applications, such as e-mail client applications, web browser applications, cloud-based or "software-as-a-service" applications, and the like. These applications may store user data and settings differently than applications that primarily operate on local user content. For example, an email client application may connect to an email server that provides storage for email folders. The email server may maintain folders of most user content and allow multiple email clients on multiple platforms to connect to the server to interact with the user content. The server may push received emails to connected email clients.

Accordingly, client-server type applications may store a more limited set of information locally than do applications that operate primarily on local user content. It will be appreciated, however, that it is becoming increasingly common for applications to store some information locally and other information non-locally. As such, the categorization of applications according to their type of data storage is intended only to add clarity to the discussion of functionality of various embodiments and is not intended to limit the scope of any embodiment as falling within only a single category of functionality. For example, an email client may act more like a local storage type of application in certain use cases (e.g., when composing a locally-saved draft of an email using a non-web-based email client), while the same email client may act more like a client-server application in other use cases (e.g., when exchanging email data with a remote email server). Indeed, when an application is (or is acting more like) a client-server type application, the application may need to provide functionality that may not be needed in an application having purely local interactions. For example, for a particular client-server application, multiple clients may each need to send and receive information from the server while maintaining a single, substantially unified application interaction state.

In one embodiment for providing seamless translation of application state between multiple client applications in a client-server context, a first client application (e.g., email client), running on a first operating system (e.g., mobile OS 130), communicates with a remote communications server over a communications protocol (e.g., IMAP, POP3, Exchange, etc.). The first client stores all application state information in an application state data store on the first operating system. For example, an email client application may store user data (e.g., email folders, draft email, calendar appointments, etc.), user settings (e.g., screen layout, message appearance, notification settings, etc.), and application context information (e.g., current cursor position, highlighted text, undo information and levels, etc.). As a result of user interaction with the first client application, the first client application has a current user interaction state.

In response to an event (e.g., dock event), a second client application launches on a second operating system and connects to the application state data store. The second application receives the application state information for the current user interaction state of the first application including user content, user settings, and application context information from the application state data store. That is, the second client application does not directly communicate with the server. Instead, the first client application performs all communication with the server and maintains a local copy of all application state data in the application state data store. The second client application receives application state information from the application state data store.

In an alternative embodiment for providing seamless translation of application state between multiple client applications in a client-server context, a first client application (e.g., email client), running on a first operating system (e.g., mobile OS 130), communicates with a remote communications server over a communications protocol (e.g., IMAP, POP3, Exchange, etc.). The first client stores application state information in an application state data store. The application state information includes user content, user settings, and application context information that is not typically stored on the remote server. For example, an email client application may store user settings (e.g., screen layout, message appearance, notification settings, etc.), and application context information (e.g., current cursor position, highlighted text, undo information and levels, etc.). As a result of user interaction with the first client application, the first client application has a current user interaction state.

In response to an event (e.g., dock event), a second client application launches on a second operating system, connects to the remote server, and connects to the application state data store to receive the application state information. For example, an email client application running on the second OS may connect to the server for most user content (e.g., email folders, draft email, calendar appointments, etc.), and connect to the application state data store for additional application state information including user settings (e.g., screen layout, message appearance, notification settings, etc.) and application context information (e.g., current cursor position, highlighted text, undo information and levels, etc.). The second application rebuilds the current user interaction state of the first application from the user content received from the remote server and the application state information received from the application state data store.

Some other types of client-server applications provide an interface and functionality to navigate and present Internet-based content. These types of applications may include, for example, web browsers and cloud-based applications (e.g., productivity applications, file management and/or storage applications, streaming media applications, Internet radio applications, IP-based telephony and/or conferencing applications, etc.). Preserving an apparently common application interaction state across these types of applications running in multiple user environments can present different and/or additional issues from those situations involving purely local applications. For example, web browsers can maintain a substantial amount of information relating to user settings and sessions of the browser. In addition, web content can be highly dynamic and interactive (e.g., CSS, flash animation, applets, javascript, forms, etc.). A web-browser may also run applications within the browser (e.g., applets, etc.), have varying access to or support for plug-ins, etc. In some instances, the web-browser may be used as a virtual operating system within an operating system (e.g., applets, cloud-based applications). Further, web browsers may be used to provide secure sessions and/or other secure communications, user authentication and/or tracking, and the like.

Returning to FIGS. 8-10 for the sake of illustration, a mobile browser is running as application 854 on mobile OS 130 and is presenting a user application window through the user environment associated with mobile OS 130. Desktop OS 160 is running concurrently on the mobile device (on processor 114 of the mobile device 110) with mobile OS 130 on shared kernel 320. The current user interaction state of the mobile browser application includes user content, user settings, and an application context. User content for the mobile browser application may include cookies, tokens, user data (e.g., being provided to a form, etc.), and/or any other information generated for or by the user in relation to the browser (e.g., including any browser-implemented applications or sessions). User settings may include home page settings, saved browser history, saved bookmarks or favorites, proxy settings, and/or any other information stored for the user in relation to the browser. Application context may include current state information for the browser. In some embodiments, application context only includes the currently displayed URL. In other embodiments, the application context includes additional information, such as currently selected text, current pointer location, etc.

At some time, the user docks mobile computing device 110 to secondary terminal environment 940 (e.g., as illustrated in FIG. 9). It may be desirable to switch the user's interaction context from the mobile browser to a desktop browser application 1084 running on desktop OS 160 and presenting application window 1086 on a second user environment associated with desktop OS 160 (e.g., as illustrated in FIG. 10). Mobile browser application 854 and desktop browser application 1084 may share user settings and application context information as described above. In some cases, the shared application context involves passing only the current URL; while in other cases, more advanced context sharing occurs, as described more fully below. As discussed above, application context information can be updated in the application state data store 742, and the application state data store 742 can push the change to the other application through a notification channel to maintain a consistent user interaction state, where desired.

A number of browser-specific issues may be handled in different ways by different embodiments. One such issue is that many web servers are configured to deliver different content (or the same content displayed in a different format) for different types of browsers. This can be particularly true for mobile versus desktop types of browsers, as many web pages are designed to exploit the different user interaction environments differently (e.g., to exploit differences in display size, resolution, support for plug-ins like Flash, etc.). An HTML request for a webpage from a browser may include an "agent string" that identifies browser characteristics, including browser type. A web server can respond to the request differently depending on whether the agent string indicates that the request came from a mobile versus a desktop browser. Suppose a user is viewing a mobile version of a webpage on the mobile device through the mobile browser application, and the user then docks with the desktop environment.

In one scenario, the mobile version of the webpage is displayed on the desktop environment as a remotely rendered window of the mobile browser. For example, techniques for remote rendering in this way are described in U.S. patent application Ser. No. 13/246,665, filed Sep. 27, 2011, entitled "Instant Remote Rendering," the entire contents of which is incorporated herein by reference. This type of remote rendering may be implemented as a default condition for all pages being viewed prior to a docking event. Alternatively, the remote rendering may be invoked after a determination is made that the mobile version of the webpage would not render (e.g., that requesting the mobile version of the webpage from the desktop browser would result in an error) or that the webpage would render improperly or in an undesirable way.

In another scenario, the URL of the mobile version of the webpage is transferred to the desktop browser as context information. The desktop browser can then request the URL again and/or use any cached information (e.g., which may be stored as user data or context information). Depending on the implementation of the webpage, a number of results are possible. For example, the desktop may be able to display the information returned from the web server, the web server may return an error indicating that the browser is incompatible with the request, the web server may reinterpret the request and return the desktop version of the requested website, etc. Alternatively, the desktop browser may be configured to change the agent string in the request to appear as a mobile browser.

Another such browser-related issue can occur when the user is interacting with content over an SSL session, or the like. Some embodiments may simply not allow transfer of this session to the desktop environment (e.g., to the desktop browser), and may, for example, return an error, warning, or other indication. Other embodiments establish the SSL session through a proxy server, which may effectively route the SSL session to the appropriate mobile or desktop browser. For example, the proxy server may be configured to act as a network address translator (NAT), which handles the SSL session and routes the session communications (e.g., securely) to one or more of the mobile or desktop browsers. Still other embodiments remotely render the SSL session from the mobile browser to the desktop environment, as discussed above. Any of these embodiments may further include detecting the SSL session prior to performing functionality to handle the SSL session.

Yet another such browser-related issue can occur when the user is interacting with a webpage that involves cookies, or the like, prior to the docking event. According to some embodiments, the cookie information either transfers to the desktop browser environment upon docking or is stored as context information that is accessible to the desktop browser. Certain types of cookies and the like cannot transfer (or at least cannot transfer in a way that is reliable or useful). Accordingly, some embodiments handle this type of cookie information either by ignoring it, by translated it to transferrable information where possible, etc. Similar scenarios may be handled by various embodiments in the context of user authentication information, tokens, etc. For example, in the case of a webpage to which the user has logged in, after docking, the desktop browser may return the user to a login page or display the page without incident, depending on the implementation of the webpage's source code, etc. Alternatively, that type of user authentication may be detected, and the docking event may cause the transfer of the interaction environment to be handled otherwise (e.g., by remote rendering, by proxy server handling, etc.).

Still another such browser-related issue can occur when the user is interacting with web-based content that involves user data. Depending on the implementation of the content, the user data may be stored locally and/or non-locally. For example, a web-based productivity application (e.g., word processor, spreadsheet application, etc.), game, etc. may include a current user state, selected text, settings, etc. Embodiments typically handle locally stored data as discussed above. Regarding non-local data, some embodiments either re-request the data for the new browser environment when needed after docking or ignore the data when it cannot practically be re-requested.

Even another such browser-related issue can occur when the user is interacting with (e.g., actively interacting or just has open) multiple webpages concurrently. Typically, mobile browsers are configured to display only a single webpage (or a very limited number of webpages) at a time, while desktop browsers can use multiple browser windows and/or multiple tabs to display many webpages at a time. Some embodiments transfer each open webpage in the mobile browser to a new tab or window in the desktop browser (e.g., according to user settings, default settings, etc.). As discussed above, a number of cases can arise in which the webpage cannot simply be transferred (or cannot be transferred in a desirable way) from the mobile environment to the desktop environment. Accordingly to certain embodiments, each webpage to be transferred is treated independently. For example, for each webpage that cannot be simply transferred, the webpage is either not transferred (e.g., kept on the mobile environment only), displayed through remote rendering, translated to an appropriate desktop version, routed through a proxy, etc.

Figure 12:
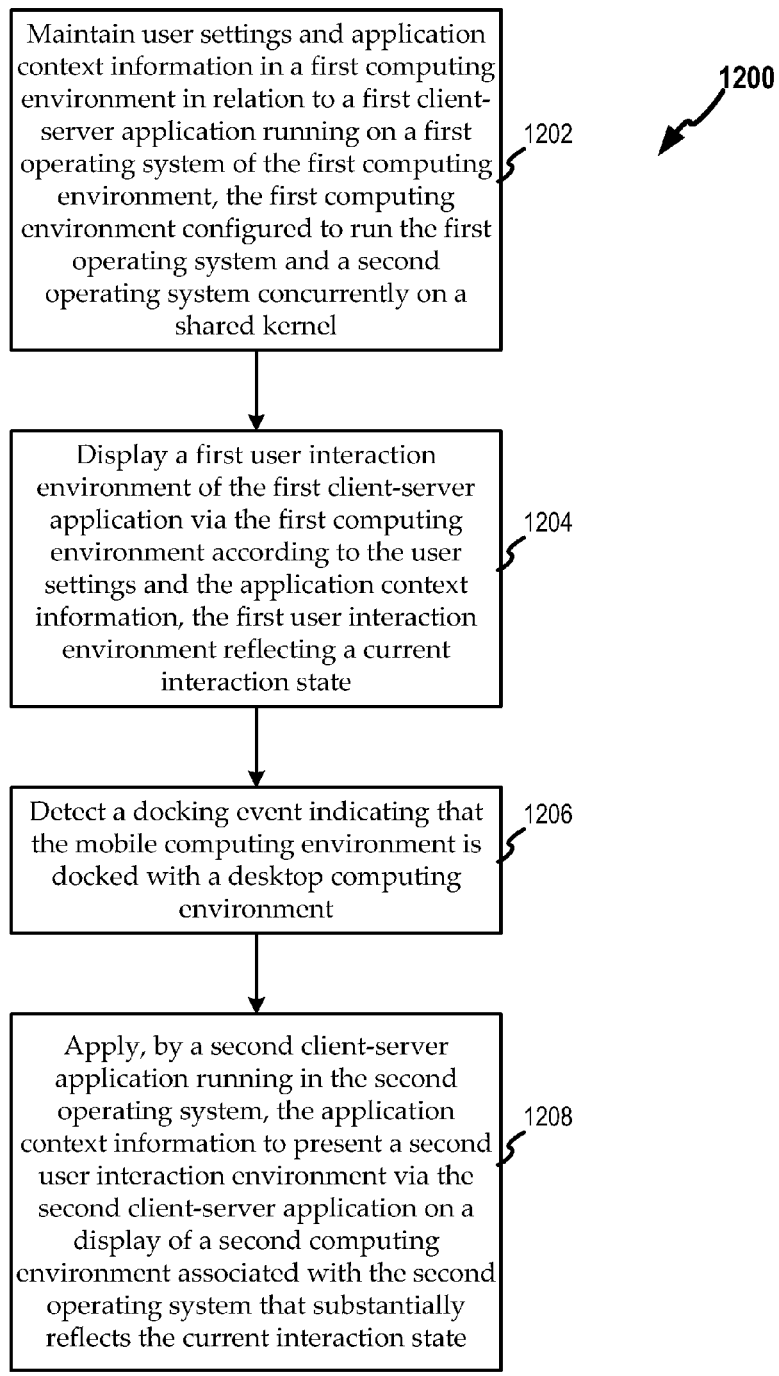
FIG. 12 illustrates another exemplary process flow for translation of application data between separate applications running on independent operating systems and displayed in separate user environments, according to various embodiments.

FIG. 12 illustrates a process flow 1200 for seamless translation of application state between multiple client applications in a client-server context, according to various embodiments. Process flow 1200 begins at block 1202, where user settings and application context information are maintained in a first computing environment in relation to a first client/server application running on a first operating system of the first computing environment, where the first computing environment is configured to run the first operating system and a second operating system concurrently on a shared kernel. At block 1204, a first user interaction environment of the first client-server application is displayed via the first computing environment according to the user settings and the application context information, the first user interaction environment reflecting a current interaction state. At block 1206, a docking event is detected indicating that the mobile computing environment is docked with a desktop computing environment. At block 1208, a second client-server application running in the second operating system applies the application context information to present a second user interaction environment via the second client-server application on a display of the second computing environment that substantially reflects the current interaction state. Through process flow 1200, the user can switch seamlessly from the first client/server application in the first computing environment to the second client/server application in the second computing environment without losing the current interaction state.

It will be appreciated that the above issues and scenarios are intended only to be illustrative of possible cases and techniques for handling those cases. Many other similar cases are possible and can be handled according to the techniques described above. Further, descriptions referring specifically to webpages can, in most cases, also be handled similarly for other web-based content, such as web-based (e.g., cloud-based, software-as-a-service, etc.) games and applications. As such the specific descriptions above of client-server applications should not be construed as limiting the scope of embodiments described herein.

The foregoing description has been presented for purposes of illustration and description. Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:
maintaining user settings and application context information in a first computing environment in relation to a first client-server application running on a first operating system of the first computing environment, the first computing environment configured to run the first operating system and a second operating system concurrently on a single shared kernel;
displaying a first user interaction environment of the first client-server application via the first computing environment according to the user settings and the application context information, the first user interaction environment reflecting a current interaction state;
detecting a docking event indicating that the mobile computing environment is docked with a desktop computing environment;
in response to the docking event:
closing the first client-server application running on the first operating system of the first computing environment;
launching a second client-server application running in the second operating system;
the second client-server application accessing the user settings and application context information associated with the first client-server application; and
applying, by the second client-server application running in the second operating system, the application context information to present a second user interaction environment via the second client-server application on a display of a second computing environment associated with the second operating system that substantially reflects the current interaction state.

2. The method of claim 1, wherein the second user interaction environment looks substantially like the first user interaction environment.

3. The method of claim 1, wherein the first operating system is a mobile operating system implemented on a mobile processor, and the second operating system is a desktop operating system implemented on the mobile processor.

4. The method of claim 1, wherein the first computing environment is a mobile computing environment implemented in a mobile device on a mobile processor comprising the shared kernel, and the second computing environment is a desktop computing environment.

5. The method of claim 1, wherein the application context information is stored in a database accessed by the first and second applications through an application programming interface.

6. The method of claim 1, further comprising: launching the second client-server application in response to detecting the docking event.

7. The method of claim 6, wherein the first client-server application and the second client-server application are web browsers and the application context information comprises cookies.

8. The method of claim 1, further comprising:
detecting whether the current interaction state is directly compatible with display via the second client-server application, wherein presenting the second user interaction environment via the second client-server application on the display of the second computing environment that substantially reflects the current interaction state comprises displaying the first user interaction environment of the first client-server application via the display of the second computing environment when the current interaction state is not directly compatible with display via the second client-server application.

9. The method of claim 1, further comprising:
detecting whether the current interaction state is directly compatible with display via the second client-server application, wherein presenting the second user interaction environment via the second client-server application on the display of the second computing environment that substantially reflects the current interaction state comprises translating the current interaction state into a compatible interaction state tailored for the second client-server application and presenting the compatible interaction state via the second user interaction environment when the current interaction state is not directly compatible with display via the second client-server application.

10. The method of claim 1, wherein the application context information comprises a network address of information displayed to a user by the first client-server application via the first computing environment immediately prior to detecting the docking event.

11. The method of claim 10, wherein the first client-server application is a mobile web browser and the second client-server application is a desktop web browser and the network address comprises a uniform resource listing (URL) address.

12. The method of claim 1, wherein: the first client-server application is a mobile web browser and the second client-server application is a desktop web browser; the application context information comprises a plurality of network addresses, each indicating a webpage open on the mobile web browser immediately prior to detecting the docking event; and presenting the second user interaction environment via the second client-server application on the display of the second computing environment that substantially reflects the current interaction state comprises assigning each of the plurality of network addresses to a separate tab of the desktop web browser.

13. A computing device including a computer-readable medium storing instructions for a physical processor, the instructions, when executed, causing the processor to perform steps comprising:
maintaining user settings and application context information in a first computing environment in relation to a first client-server application running on a first operating system of the first computing environment, the first computing environment configured to run the first operating system and a second operating system concurrently on a single shared kernel;
displaying a first user interaction environment of the first client-server application via the first computing environment according to the user settings and the application context information, the first user interaction environment reflecting a current interaction state;
detecting a docking event indicating that the mobile computing environment is docked with a desktop computing environment; and
in response to the docking event:
closing the first client-server application running on the first operating system of the first computing environment;
launching a second client-server application running in a second operating system;
accessing the user settings and application context information associated with the first client-server application; and
applying, by the second client-server application running in the second operating system, the application context information to present a second user interaction environment via the second client-server application on a display of a second computing environment associated with the second operating system that substantially reflects the current interaction state.

14. The computing device of claim 13, wherein the second user interaction environment looks substantially like the first user interaction environment.

15. The computing device of claim 13, wherein the first operating system is a mobile operating system implemented on a mobile processor, and the second operating system is a desktop operating system implemented on the mobile processor.

16. The computing device of claim 13, wherein the first computing environment is a mobile computing environment implemented in a mobile device on a mobile processor comprising the shared kernel, and the second computing environment is a desktop computing environment.

17. The computing device of claim 13, wherein the application context information is stored in a database accessed by the first and second applications through an application programming interface.

18. The computing device of claim 13, wherein the instructions, when executed, further cause the processor to perform the step of launching the second client-server application in response to detecting the docking event.

19. The computing device of claim 18, wherein the first client-server application and the second client-server application are web browsers and the application context information comprises cookies.

20. The computing device of claim 13, wherein the instructions, when executed, further cause the processor to perform the step of: detecting whether the current interaction state is directly compatible with display via the second client-server application, wherein presenting the second user interaction environment via the second client-server application on the display of the second computing environment that substantially reflects the current interaction state comprises displaying the first user interaction environment of the first client-server application via the display of the second computing environment when the current interaction state is not directly compatible with display via the second client-server application.

* * * * *